(12) United States Patent
Sun et al.

(10) Patent No.: US 12,470,979 B2
(45) Date of Patent: Nov. 11, 2025

(54) REPLICATION IN A WIRELESS COMMUNICATION NETWORK

(71) Applicant: Telefonaktiebolaget LM Ericsson (publ), Stockholm (SE)

(72) Inventors: Ying Sun, Täby (SE); Torsten Dudda, Wassenberg (DE); Yufei Blankenship, Kildeer, IL (US); Zhenhua Zou, Solna (SE); Siva Muruganathan, Stittsville (CA); Helka-Liina Määttänen, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 365 days.

(21) Appl. No.: 18/024,575

(22) PCT Filed: Sep. 1, 2021

(86) PCT No.: PCT/EP2021/074071
§ 371 (c)(1),
(2) Date: Mar. 3, 2023

(87) PCT Pub. No.: WO2022/049094
PCT Pub. Date: Mar. 10, 2022

(65) Prior Publication Data
US 2023/0319625 A1    Oct. 5, 2023

Related U.S. Application Data

(60) Provisional application No. 63/074,775, filed on Sep. 4, 2020.

(51) Int. Cl.
H04W 28/00    (2009.01)
H04L 1/1867   (2023.01)
H04W 28/04    (2009.01)

(52) U.S. Cl.
CPC ............ *H04W 28/04* (2013.01); *H04L 1/189* (2013.01)

(58) Field of Classification Search
None
See application file for complete search history.

(56) References Cited

U.S. PATENT DOCUMENTS

2018/0324642 A1* 11/2018 Yu ..................... H04W 36/0055
2019/0082040 A1*  3/2019 Aziz .................... H04L 69/324
(Continued)

FOREIGN PATENT DOCUMENTS

WO    2021183036 A1    9/2021

OTHER PUBLICATIONS

3GPP, "3GPP TS 23.501 V16.5.1", 3rd Generation Partnership Project; Technical Specification Group Services and System Aspects; System architecture for the 5G System (5GS); Stage 2 (Release 16), Aug. 2020, 1-440.

(Continued)

*Primary Examiner* — Brandon M Renner
(74) *Attorney, Agent, or Firm* — Murphy, Bilak & Homiller, PLLC

(57) ABSTRACT

A wireless communication device (412) replicates, at a Radio Link Control (RLC) layer of a protocol stack of the wireless communication device (412), an original packet associated to a particular service to provide one or more replicate packets. Each of the one or more replicate packets is a replication of the original packet. For each packet from among a set of packets consisting of the original packet and at least one of the one or more replicate packets, the wireless communication device (412) generates a transport block that comprises the packet and transmits the transport block to one or more base stations or transmission/reception points, (Continued)

TRPs, via a physical layer of the protocol stack of the wireless communication device (412).

28 Claims, 13 Drawing Sheets

(56) References Cited

U.S. PATENT DOCUMENTS

| | | | |
|---|---|---|---|
| 2020/0128599 A1* | 4/2020 | Tang | H04W 72/1268 |
| 2020/0187284 A1* | 6/2020 | Turtinen | H04W 36/00692 |
| 2021/0184817 A1* | 6/2021 | Nammi | H04L 5/0051 |
| 2022/0312478 A1* | 9/2022 | Kuang | H04W 74/0833 |

OTHER PUBLICATIONS

3GPP, "3GPP TS 38.213 V16.2.0", 3rd Generation Partnership Project; Technical Specification Group Radio Access Network; NR; Physical layer procedures for control (Release 16), Jun. 2020, 1-176.

3GPP, "3GPP TS 38.214 V16.3.0", 3rd Generation Partnership Project; Technical Specification Group Radio Access Network; NR; Physical layer procedures for data (Release 16), Sep. 2020, 1-166.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, 1-906.

Aijaz, Adrian, "Pack Duplication in Dual Connectivity Enabled 5G Wireless Networks: Overview and Challenges", IEEE Communications Standards Magazine, Wireless and Radio Communications, Sep. 2019, 20-28.

Potevio, "Intra-UE multiplexing for URLLC", 3GPP TSG RAN WG1 Meeting #102-e, R1-2006870, e-Meeting, Aug. 17-28, 2020, 1-3.

Vivo, "Discussion on Multi-TRP based URLLC transmission and UL simultaneous TX", 3GPP TSG RAN WG1 Ad-Hoc Meeting 1901, R1-1900143, Taipei, Jan. 21-25, 2019, 1-4.

* cited by examiner

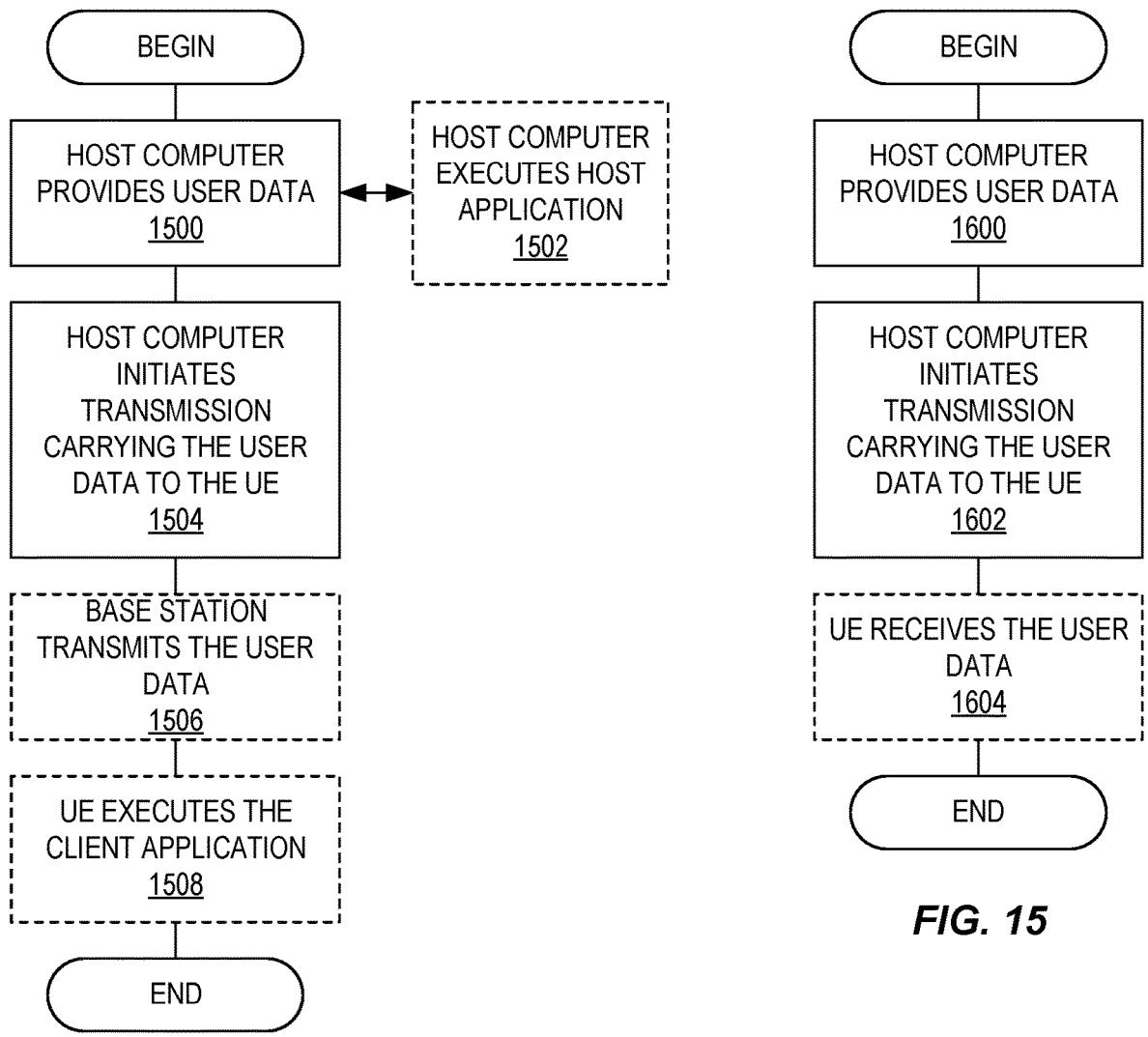

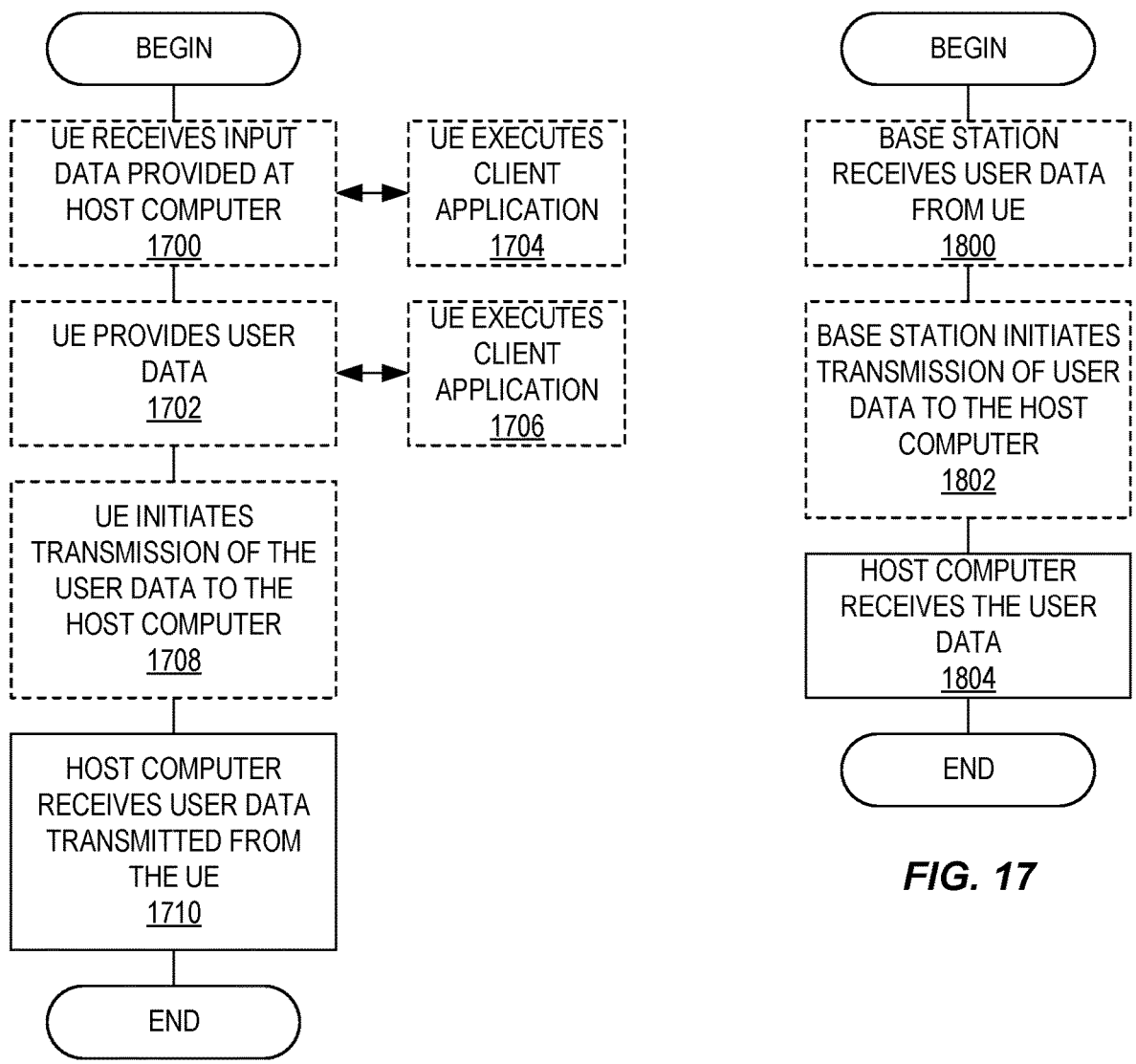

REPLICATION IN A WIRELESS COMMUNICATION NETWORK

TECHNICAL FIELD

The present application relates generally to a wireless communication network, and relates more specifically to replication in such a network.

BACKGROUND

Retransmissions are commonly used in a wireless communication network to meet application layer reliability requirements. Retransmission may be performed on different protocol layers, e.g., Transmission Control Protocol (TCP), Packet Data Converge Protocol (PDCP), Radio Link Control (RLC), and Medium Access Control (MAC) layers. These retransmission schemes in different protocol layers are performed when the transmission feedback indicates that the transmission has failed. For example, a MAC layer failure resulting from failed Hybrid Automatic Repeat Request (HARQ) (re-)transmissions in MAC the layer will trigger a retransmission of an RLC packet. Multiple RLC retransmission failures will result in a failed transmission of a PDCP packet and thus a PDCP retransmission will be triggered. At the TCP layer, if a TCP acknowledgement is not received, a retransmission of a TCP packet will be triggered.

These retransmission schemes operate on demand, based on transmission feedback, and are optimized for resource utilization efficiency. For example, if a transmission failed, a retransmission is triggered, and the extra resources are consumed only if a retransmission occurs. However, since any retransmission loop will require at least a round trip time delay to receive the feedback information, the retransmission schemes are not optimized to minimize latency and transmission delay.

Problematically, then, no retransmission schemes exist with the purpose to optimize both spectrum efficiency and latency at a higher protocol layer. This proves challenging especially for guaranteed delay critical Guaranteed Bit Rate (GBR) services. Consider, for example, a smart grid service in a large Mobile Network Operator (MNO) network, with required packet error rate (PER) below $10^{-5}$ and with a packet delay budget=3 ms in the Radio Access Network (RAN), e.g., where a 5G Quality of Service (QoS) Identifier (5QI) is equal to 85. In this example, retransmissions that may be required for reliability purposes in different layers are not affordable due to the latency constraint.

In order to improve reliability with latency optimized, multiple replicated/repeated packets can be simultaneously transmitted in multiple independent paths, e.g., formed from time, frequency, and spatial resources. Doing so may improve reliability with a relaxed block error rate (BLER) target at each individual transmission path.

One example of an existing repetition/duplication concept is Packet Data Convergence Protocol (PDCP) duplication. In PDCP duplication, PDCP packets are duplicated in different carriers or bands. FIG. 1 shows PDCP duplication based on a dual connectivity (DC) scheme whereas FIG. 2 shows PDCP duplication based on a carrier aggregation (CA) scheme. A maximum of four copies are supported. The number of replications is Radio Resource Control (RRC) configured and can be activated through a MAC Control Element (CE) or RRC configuration. Specifically, FIG. 1 illustrates an example with a combined DC and CA configuration with four configured RLC entities for PDCP data duplication and only four activated RLC entities. In this case, both the Master Cell Group (MCG) and the Secondary Cell Group (SCG) in DC implement PDCP data duplication. FIG. 2 illustrates an example with a CA-only configuration, with three configured RLC entities for PDCP data duplication and only two activated RLC entities.

Another example of latency optimization is HARQ repetition in the MAC layer. The number of HARQ repetitions can be decided based on the radio condition and adjusted every Transmit Time Interval (TTI) through a scheduling decision and Layer 1 (L1) Downlink Control Information (DCI) signaling. If the radio condition is good, no repetition is needed; on the other hand, if the radio condition is poor, more repetitions can be scheduled through DCI. One potential benefit for HARQ repetitions comparing to other higher layer repetition/replications is that there is an extra soft combining gain depending on how many HARQ repetitions are transmitted; this is not possible with higher layer replication such as PDCP duplications. One limitation of HARQ repetition in the MAC layer, though, is that the exact coded Transport Block (TB) at the physical layer has to be replicated.

These and other known approaches to replication nonetheless prove unsatisfactory for optimizing latency and transmission delay under some circumstances. For example, known replication approaches cannot provide a reliability enhancement for Ultra Reliable Low Latency Communication (URLLC) and enhanced Mobile Broadband (eMBB) services that have different reliability requirements. The eMBB service in this regard has a relatively low latency requirement compared to the URLLC service, but the eMBB service requires much higher throughput. In common use cases, both URLLC and eMBB must be operating in parallel to the same user (i.e., to the same user equipment, UE). Therefore, when a URLLC data packet arrives, it must be prioritized over eMBB packet(s).

If eMBB and URLLC data are multiplexed (concatenated) in the same TB (transport block), the URLLC reliably requirement (up to $10^{-6}$ BLER) must be applied for the whole TB. Increasing reliability implies lowering spectral efficiency, so this concatenation leads to low special efficiency for eMBB traffic. This is because usually only $10^{-1}$ BLER should be used for the initial transmission of eMBB, as any errors can for eMBB be taken care of by HARQ retransmissions. Lower BLER requirements have to be achieved by using robust link adaptation, e.g., low code rate. For URLLC, due to low latency requirements, HARQ retransmission may not be possible.

With PDCP duplication, reliability is improved, but PDCP duplication has limitations so that spectrum efficiency is not well optimized. The replications have to be in different frequency carriers (CA based) or from different base stations (dual-connectivity based). Within one cell, there is only one copy. That means it is not possible to support the reliability improvement with multiple replicated higher layer packets in one cell. For the downlink, it is possible for the base station to decide the number of copies of a URLLC packet and the resources at which to transmit, but this is heretofore not supported in the uplink. Furthermore, it is not possible to dynamically decide the number of replicated transmissions in PDCP duplication approaches. Based on the radio condition, the most appropriate replication scheme varies. For example, if the radio condition is good enough, potentially it is more efficient to schedule the packet with more robust link adaptation (i.e., large signal-to-interference-plus-noise-ratio, SINR, margin) on one transmission path. On the other hand, when the radio condition is poor or there is eMBB traffic, it might be more efficient to schedule multiple replicated transmissions on multiple independent transmissions paths with more aggressive link adaptation and higher BLER target at each individual path. The adaptation of the number of replications based on the radio condition should be done per transmission time interval (TTI) based on the scheduling decision. However, this is not possible with the existing PDCP duplication scheme.

Adaptive HARQ repetition is possible based on the scheduling decision and the number of repetitions can be adjusted every TTI. However, it is in the physical layer that the complete transport block (TB) is repeated, which potentially includes eMBB data with a low reliability requirement or even padding data if Rel-16 logical channel prioritization (LCP) parameters (i.e., allowedCG-list and allowedPHY-PriorityIndex) are configured to restrict eMBB data to utilize the low BLER target grants. The physical layer does not have access to the higher-layer QoS target information.

Challenges exist therefore in increasing spectral efficiency when simultaneously multiplexing URLLC traffic with eMBB traffic to or from the same UE.

SUMMARY

According to some embodiments herein, a wireless communication device performs packet replication at a Radio Link Control (RLC) layer of the device's protocol stack, for packets associated to a particular service, e.g., a Ultra-Reliable Low-Latency Communication (URLLC) service. Different packets resulting from the packet replication are transmitted in different respective transport blocks, e.g., for transmission on different transmit paths. In one or more embodiments, each transport block also comprises data associated to one or more other services, e.g., an enhanced mobile broadband (eMBB) service. In this case, then, data for the particular service for which packet replication is performed at the RLC layer and data for one or more other services is multiplexed in the same transport block. Embodiments that multiplex data for a URLLC service and an eMBB service in the same transport block may advantageously fulfill URLLC reliability and latency requirements as well as eMBB spectrum efficiency requirements.

Some embodiments perform replication at the RLC layer dynamically. In one embodiment, for example, the number of repetitions/replications is determined based on a scheduling decision and can be adjusted every transmission time interval (TTI). Alternatively or additionally, some embodiments enhance reliability by scheduling multiple replicated transmissions without introducing extra delay. In one or more embodiments, replication is per service level, i.e. logical channel (LCH) level from the Medium Access Control (MAC) point of view. In this case, replications, e.g., for a URLLC service, can be efficiently multiplexed with non-replicated data, e.g., from an MBB service.

More particularly, embodiments herein include a method performed by a wireless communication device. The method comprises replicating, at a Radio Link Control (RLC) layer of a protocol stack of the wireless communication device, an original packet associated to a particular service to provide one or more replicate packets, wherein each of the one or more replicate packets is a replication of the original packet. For each packet from among a set of packets consisting of the original packet and at least one of the one or more replicate packets, the method also comprises generating a transport block that comprises the packet, and transmitting the transport block to one or more base stations or transmission/reception points, TRPs, via a physical layer of the protocol stack of the wireless communication device.

In some embodiments, at least one of the generated transport blocks further comprises data associated to one or more other services that is multiplexed within the transport block with the respective packet. In one or more of these embodiments, the one or more other services include a mobile broadband, MBB, service.

In some embodiments, transmitting the transport block via the physical layer of the protocol stack of the wireless communication device comprises transmitting the transport block in accordance with requirements of the particular service.

In some embodiments, the method further comprises receiving, from a network node, information related to replication of packets at the RLC layer. In this case, replicating is performed based on the received information, and the information comprises information that indicates that replication is allowed for one or more logical channels, information that indicates a maximum number of replications allowed for one or more logical channels at the RLC layer, information that indicates a fixed number of replications allowed for one or more logical channels at the RLC layer, or a combination of two ore more of the above.

In some embodiments, the method further comprises receiving, from a network node, information related to replication of packets at the RLC layer. In this case, replicating is performed based on the received information, and the information comprises information that indicates that multiplexing of any original RLC packet and one or more replicate RLC packets of the original RLC packet in a same Medium Access Control (MAC) Protocol Data Unit (PDU) is not allowed, information that indicates whether physical layer diversity is to be used for transmission of an original RLC packet and one or more replicate RLC packets of the original packet, or both of the above.

In some embodiments, the method further comprises determining how many of the one or more replicate packets to provide via replicating of the original packet, based on either signaling received from a network node indicating how many of the one or more replicate packets to provide via said replicating, or a channel state measured by the wireless communication device.

In some embodiments, the method further comprises, before all of the one or more replicate RLC packets have been transmitted, receiving, from a network node, information that indicates that the original RLC packet or one of the one or more replicate RLC packets has been successfully received by the network node, and stopping transmission of any of the one or more replicate RLC packets that have not yet been transmitted as of reception of the information from the network node. In one or more of these embodiments, receiving the information that indicates that the original RLC packet or one of the one or more replicate RLC packets has been successfully received by the network node comprises receiving an RLC status report that indicates that the original RLC packet or one of the one or more replicate RLC packets has been successfully received by a respective RLC entity at the network node, or receiving a Downlink Control Information (DCI) message that indicates a toggled New Data Indicator (NDI) for a Hybrid Automatic Repeat Request (HARQ) buffer associated to the one or more replicate RLC packets.

In some embodiments, the original packet is an original RLC packet associated to a particular logical channel. In this case, the particular logical channel is associated to the particular service, the one or more replicate packets are one or more replicate RLC packets, and each replicate RLC packet is a replication of the original RLC packet. Additionally, for each RLC packet from among the set of packets, generating the transport block for the RLC packet comprises multiplexing the RLC packet and one or more additional RLC packets that are associated to one or more other logical channels in the transport block.

In some embodiments, the original packet is an original RLC packet associated to a particular logical channel. In this case, the particular logical channel is associated to the particular service, wherein the method further comprises receiving a dynamic indication to start replication of packets for the particular logical channel. In this case, the dynamic indication is comprised in a MAC Control Element (CE) or a DCI message, and replicating the original packet associated to the particular service comprises replicating the original packet based on having received the dynamic indication to start replication, and since having received the dynamic indication to start replication, not having received a dynamic indication to stop replication for the particular logical channel.

In some embodiments, the transport blocks comprising the original packet and the one or more replicate packets are transmitted to multiple different network nodes or TRPs and/or are transmitted on multiple different cells.

In some embodiments, the method further comprises transmitting, to a network node, a buffer status report that includes a first field that reports a total buffer size of a logical channel group that contains multiple logical channels, including a logical channel associated to the particular service, and a second field that reports a total buffer size of replicated data of the multiple logical channels within the logical channel group.

In some embodiments, the method further comprises receiving an uplink grant scheduling the wireless communication device for transmission in multiple slots, and determining, based on how many slots are scheduled by the uplink grant, how many of the one or more replicate packets to provide via said replicating.

In some embodiments, the particular service is an Ultra-Reliable Low-Latency Communication, URLLC, service.

In some embodiments, the transport blocks comprising the original packet and the one or more replicate packets are transmitted on the same cell.

In some embodiments, the transport blocks comprising the original packet and the one or more replicate packets are transmitted using transmit diversity at the physical layer. In one or more of these embodiments, transmit diversity at the physical layer is provided via transmitting the transport blocks comprising the original packet and the one or more replicate packets using different time, frequency, or spatial resources. In one or more of these embodiments, transmit diversity at the physical layer is provided via transmitting the original packet and the one or more replicate packets using different TRPs, using different beams, and/or using different bandwidth parts.

Other embodiments herein include a method performed by a base station. The method comprises providing, to a wireless communication device, information related to replication of packets by the wireless communication device at a Radio Link Control (RLC) layer of a protocol stack of the wireless communication device. In this case, the replication of packets is such that the wireless communication device is to replicate an original packet associated to a particular service to provide one or more replicate packets of the original packet and to transmit each packet, from among the original packet and at least one of the one or more replicate packets, in a respective transport block.

In some embodiments, the information comprises information that indicates that replication is allowed for one or more logical channels, information that indicates a maximum number of replications allowed for one or more logical channels at the RLC layer, information that indicates a fixed number of replications allowed for one or more logical channels at the RLC layer, or a combination of two or more of the above.

In some embodiments, the information comprises information that indicates that multiplexing of any original RLC packet and one or more replicate RLC packets of the original RLC packet in a same Medium Access Control (MAC) Protocol Data Unit (PDU) is not allowed, information that indicates whether physical layer diversity is to be used for transmission of an original RLC packet and one or more replicate RLC packets of the original RLC packet, or both of the above.

In some embodiments, the method further comprises providing, to the wireless communication device, information that indicates that an original packet or one of one or more replicate packets has been successfully received by the base station. In one or more of these embodiments, the information that indicates that the original packet or one of the one or more replicate packets has been successfully received by the network node comprises receiving an RLC status report that indicates that the original packet or one of the one or more replicate packets has been successfully received by a respective RLC entity at the network node, or receiving a Downlink Control Information (DCI) message that indicates a toggled New Data Indicator (NDI) for a Hybrid Automatic Repeat Request (HARQ) buffer associated to the one or more replicate packets.

In some embodiments, the original packet is an original RLC packet associated to a particular logical channel, and the particular logical channel is associated to the particular service. In this case, the method further comprises providing, to the wireless communication device, a dynamic indication to start replication of packets for the particular logical channel, wherein the dynamic indication is comprised in a MAC Control Element (CE) or a DCI message.

In some embodiments, particular service is an URLLC service.

In some embodiments, the method further comprises receiving, from the wireless communication device, at least one of an original packet and one or more replicates of the original packet that result from the replication at the RLC layer. In one or more of these embodiments, receiving the at least one of the original packet and the one or more replicates comprises receiving the at least one of the original packet and the one or more replicates at the RLC layer. In this case, the method further comprises providing the received at least one of the original packet and the one or more replicates to a higher layer.

In some embodiments, the base station includes at least one of two or more TRPs to which the original packet and the one or more replicate packets are transmitted, and receiving the at least one of the original packet and the one or more replicates comprises receiving the at least one of the original packet and the one or more replicates at the at least one of the two or more TRPs comprised in the base station.

Other embodiments herein include a wireless communication device comprising power supply circuitry and processing circuitry. The power supply circuitry is configured to supply power to the wireless communication device. The processing circuitry is configured to replicate, at a Radio Link Control (RLC) layer of a protocol stack of the wireless communication device, an original packet associated to a particular service to provide one or more replicate packets. In this case, each of the one or more replicate packets is a replication of the original packet. The processing circuitry is also configured to, for each packet from among a set of packets consisting of the original packet and at least one of the one or more replicate packets, generate a transport block that comprises the packet, and transmit the transport block to one or more base stations or transmission/reception points, TRPs, via a physical layer of the protocol stack of the wireless communication device.

In some embodiments, the processing circuitry is configured to perform the steps described above for a wireless communication device.

Other embodiments herein include a base station comprising power supply circuitry and processing circuitry. The power supply circuitry is configured to supply power to the base station. The processing circuitry is configured to provide, to a wireless communication device, information related to replication of packets by the wireless communication device at a Radio Link Control (RLC) layer of a protocol stack of the wireless communication device. In this case, the replication of packets is such that the wireless communication device is to replicate an original packet associated to a particular service to provide one or more replicate packets of the original packet and to transmit each packet, from among the original packet and at least one of the one or more replicate packets, in a respective transport block.

In some embodiments, the processing circuitry is configured to perform the steps described above for a base station.

Other embodiments herein include a computer program comprising instructions which, when executed by at least one processor of a wireless communication device, causes the wireless communication device to perform the steps described above for a wireless communication device. Other embodiments herein include a computer program comprising instructions which, when executed by at least one processor of a base station, causes the base station to perform the steps described above for a base station. In one or more of these embodiments, a carrier containing the computer program is one of an electronic signal, optical signal, radio signal, or computer readable storage medium.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 14 is a flow chart of a method implemented in a communication system according to some embodiments.

FIG. 15 is a flow chart of a method implemented in a communication system according to other embodiments.

FIG. 16 is a flow chart of a method implemented in a communication system according to still other embodiments.

FIG. 17 is a flow chart of a method implemented in a communication system according to yet other embodiments.

DETAILED DESCRIPTION

Figure 1:
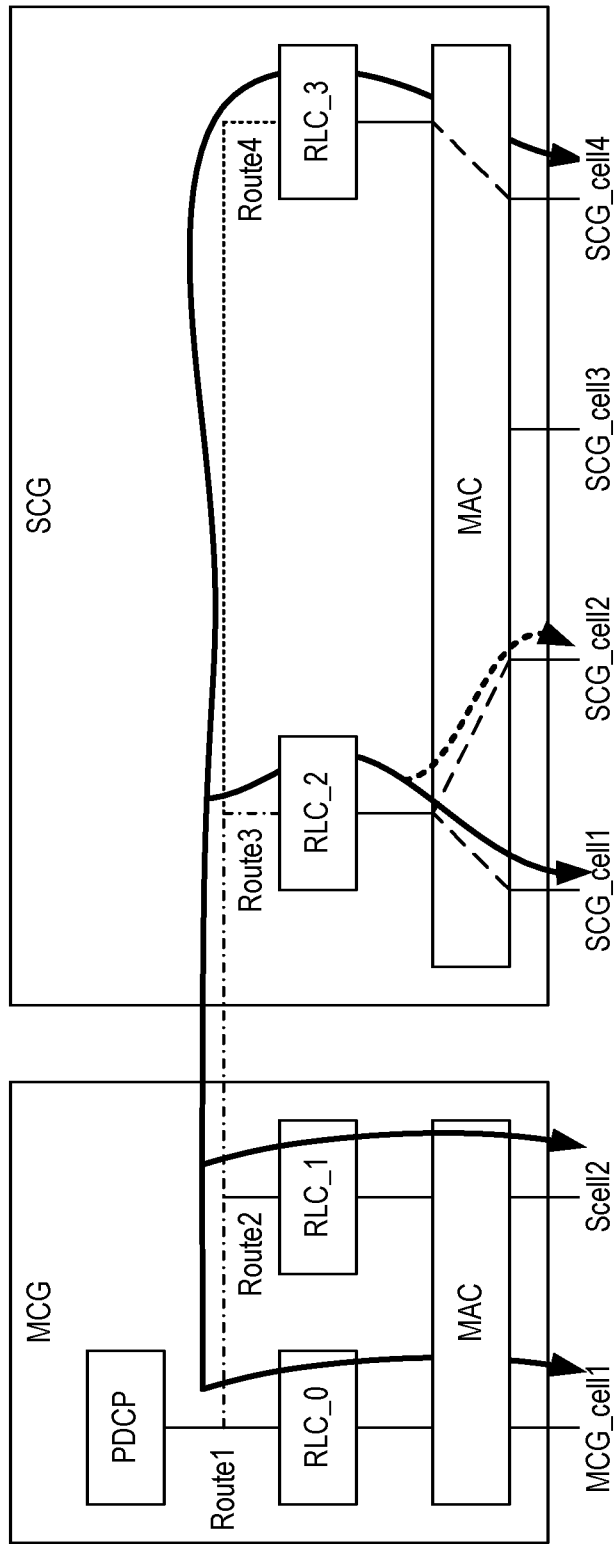
FIG. 1 is a block diagram of dual connectivity based Packet Data Convergence Protocol (PDCP) duplication.
Figure 2:
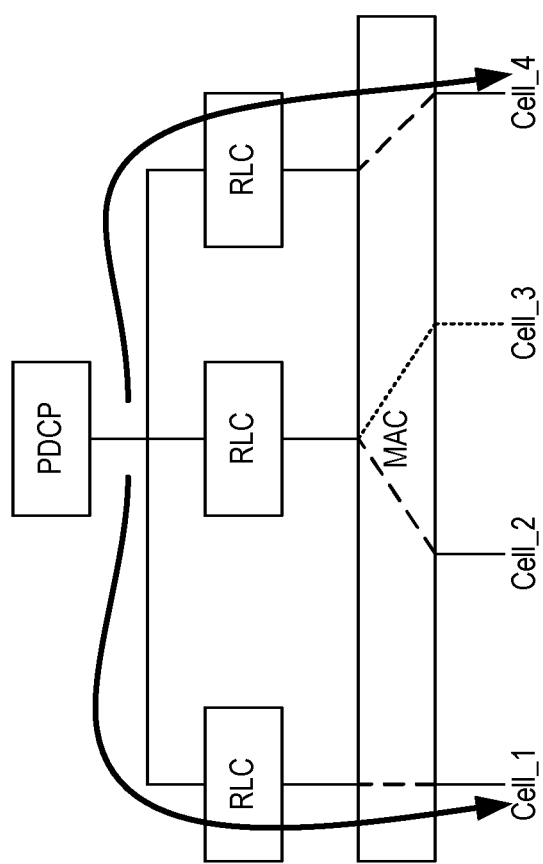
FIG. 2 is a block diagram of carrier aggregation based PDCP duplication.
Figure 3:
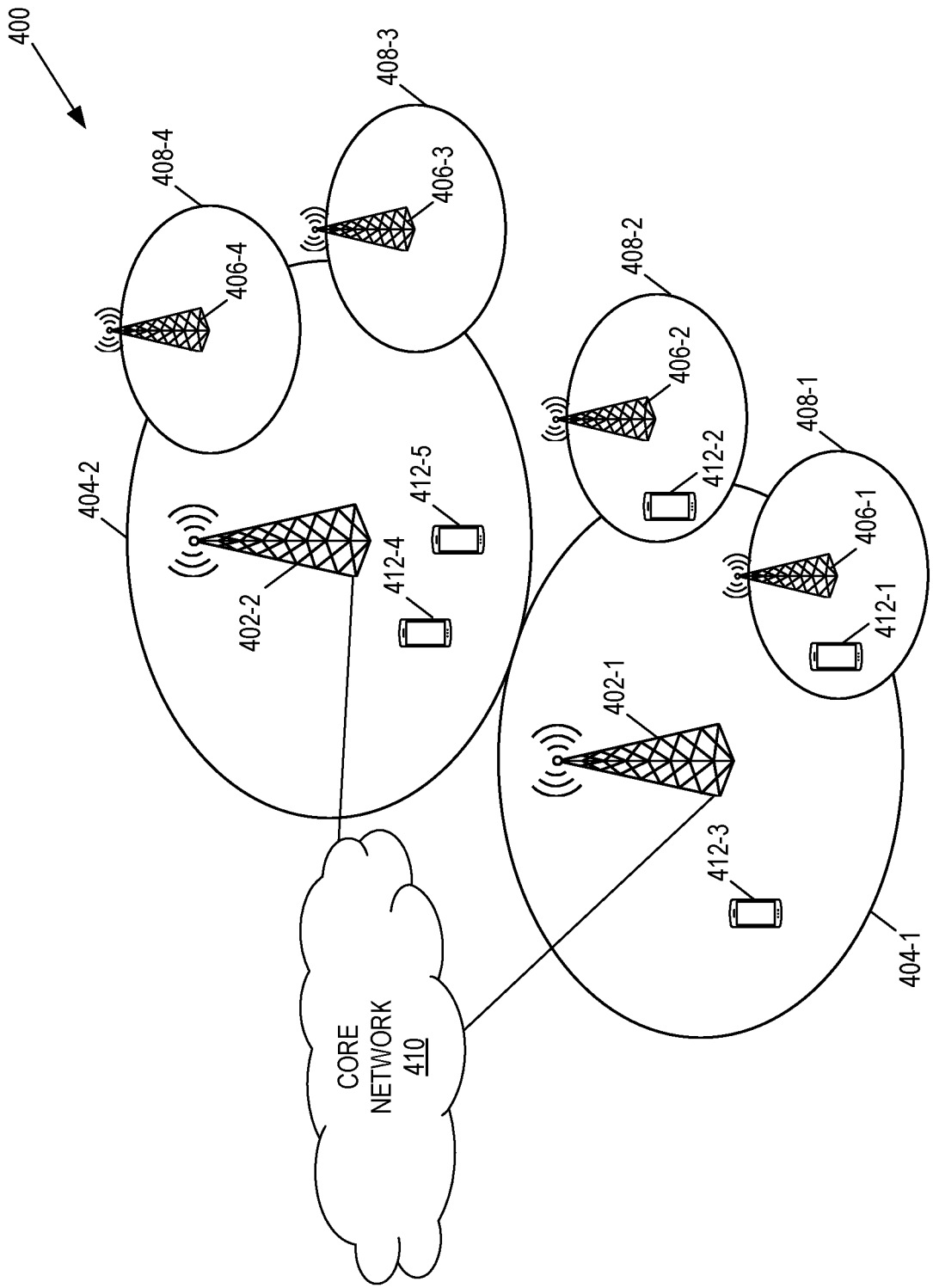
FIG. 3 is a block diagram of a cellular communications system according to some embodiments.

FIG. 3 illustrates one example of a cellular communications system 400 in which embodiments of the present disclosure may be implemented. In the embodiments described herein, the cellular communications system 400 is a 5G system (5GS) including a Next Generation Radio Access Network (RAN) (NG-RAN) and a 5G Core (5GC); however, the solution(s) described herein are not limited thereto and can be used in any wireless system in which such features are desired. In this example, the RAN includes base stations 402-1 and 402-2, which in the 5GS include NR base stations (gNBs) and optionally next generation eNBs (ng-eNBs) (e.g., Long Term Evolution, LTE, RAN nodes connected to the 5GC), controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5G System (5GS) is referred to as the 5GC. The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes user equipments (UEs), but the present disclosure is not limited thereto.

Figure 4:
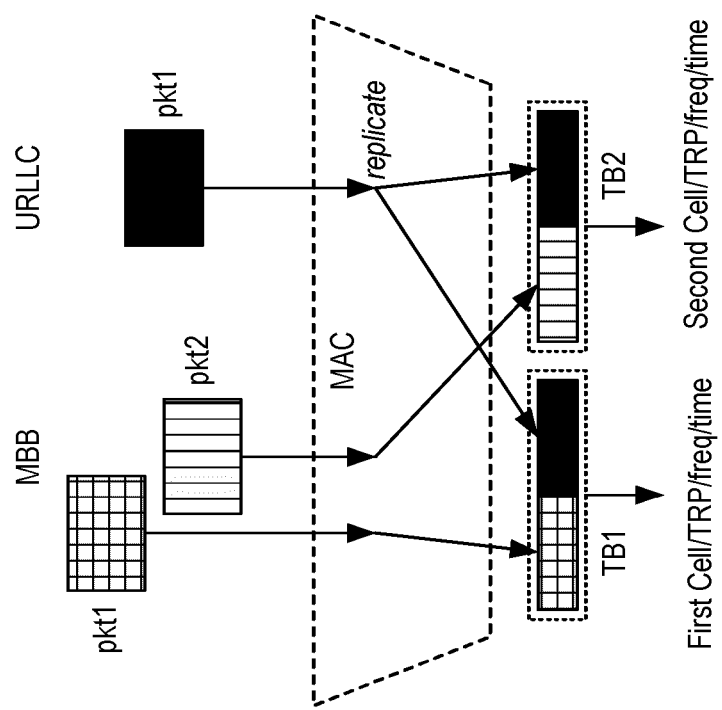
FIG. 4 is a block diagram of packet replication according to some embodiments.

According to embodiments of the present disclosure, when a logical channel is configured to replicate its data, the original data in a transport block (TB) is remembered for replicated transmission in another TB. Both original and replicated data of this logical channel may be multiplexed with data from other logical channels. This is illustrated in FIG. 4, where the same design feature can be applied to downlink transmission or uplink transmission. As illustrated, a decision is made in the MAC layer to replicate a particular packet (pkt1) (e.g., an RLC PDU or RLC SDU) for an URLLC service, for transmission in multiple TBs (i.e., TB1 and TB2 in the example of FIG. 4). The resulting copies of pkt1 for the URLLC service thus include the original packet (pkt1) and one or more replications of the original packet (pkt1). The replications are sometimes referred to herein "replicated packets", "copies" of the original packet or original data, "replicated data", or the like. The original packet (pkt1) for the URLLC service is sometimes referred to herein as the "original packet", the "original data", the "original copy", or the like. In the particular example of FIG. 4, the original pkt1 for the URLLC is multiplexed with a first packet (pkt1) of a MBB service in TB1 for transmission on a first cell, TRP, frequency resource, and/or time resource. A replication of pkt1 for the URLLC is multiplexed with a second packet (pkt2) of the MBB service in TB2 for transmission on a second cell, TRP, frequency resource, and/or time resource.

In one example, the replicated data is given higher priority compared to other logical channel data when the original data was transmitted already, in order to timely transmit also the replicated data after the original data. When the design is applied to the uplink transmission, the base station (e.g., base station 402 such as, e.g., a gNB) ensures that scheduling grants for the UE's (e.g., UE 412) uplink transmissions for the replicated data are provided.

Embodiments of the present disclosure are particularly relevant when transmission of the TBs is uncorrelated, i.e. when using different time, frequency, and/or spatial resources. This might be on same cell or on different cells. It is thus also relevant in a scenario where the TBs are transmitted via different transmission reception points (TRPs). Note that TRP may not be captured in 3GPP specifications. A TRP throughout this disclosure may be represented by a spatial relation or a Transmission Configuration Indicator (TCI) state.

Embodiment 1: Packet Replication in Logical Channel Level with RRC Configuration In this embodiment, replication is at the logical channel level (e.g., above the MAC layer and/or in the RLC layer). More specifically, in this embodiment, a logical channel (or a set of one or more logical channels) is associated to a particular service(s) (e.g., an URLLC service(s)) for which replication is performed. An RLC packet for the logical channel (or the set of logical channels) is replicated at the RLC level. Note that, as used herein, an "RLC packet" may be an RLC Service Data Unit (SDU) or an RLC Protocol Data Unit (PDU), where an RLC SDU is the input to the RLC layer and the RLC PDU is the output of the RLC layer. Thus, in other words, replication at the RLC layer may be replication of the RLC SDU received from the higher layer (e.g., the PDCP layer) or replication of the RLC PDU output to the MAC layer. Also, as noted above, while the description below focuses on a single logical channel for which RLC replication is performed, replication may be performed at the RLC layer for a set of one or more logical channels associated to one (or more) services (e.g., one or more URLLC services). There may be a one to one mapping between these logical channels and the respective services or more than one logical channel may map to the same service or more than one service may map to the same logical channel.

Some embodiments introduce one or more of the following Radio Resource Control (RRC) parameters for a given logical channel (e.g., a logical channel that corresponds to a URLLC service).

In one embodiment, an allowPacketReplication parameter (Boolean) specifies if the packet repetitions/replication from the logical channel is allowed or not. In an alternative, a UE may be configured with a packet replication number which directly enables the RLC packet replication. This packet replication number may alternatively be understood as a minimum number of replications and may be used together with another parameter that specifies a max number of replications.

Alternatively or additionally, in one embodiment, a #maxNrOfReplication parameter specifies the maximum number of replications/repetitions that is allowed. In an alternative, a fixed number of replications is configured.

Alternatively or additionally, a forbidToMultiplexReplicatesInSameMacPDU parameter (Boolean) specifies if it is allowed to multiplex the replicated RLC/PDCP packets in the same MAC PDU. When it is set to true, the replicated RLC/PDCP packets are not allowed to be multiplexed in the same MAC PDU.

Alternatively or additionally, an enablePhyLayerDiversity field (Boolean or enumerated) describes if physical layer diversity is to be used, e.g., in time or spatial domain. That is, any TCI state or spatial direction are different and per TRP and related to TRP.

In some embodiments, the fields above may be combined in a single feature/configuration.

In one embodiment, a logical channel (e.g., a logical channel associated to a URLLC service) may be configured with RLC Acknowledgement Mode (AM) mode together with the repetitions. In the AM mode, the receiving RLC entity sends an RLC status report to tell the transmitting RLC entity if an RLC packet (e.g., an RLC PDU) is received correctly or not. Here, if the transmitting RLC entity is still sending repetitions for a given RLC packet, the reception of ACK of one of the RLC replicated packets stops the repetitions.

In an alternative embodiment, the RLC status report is modified to work with repetitions such that there may be ACK only for each original copy of the RLC packet. This can be achieved for example by adding a sequence number that only takes into account new packets. From this sequence number, the receiving RLC entity also knows which RLC packets are the same (i.e., knows which replicated packet(s) and original packet are the same). This can be useful if e.g. in m TRP transmissions the packets are received out of order due to different delays. Note that this RLC status report change can apply to both UL and DL status reports.

In an alternative embodiment, if there is no RLC segmentation, a received DCI indicating a toggled New Data Indicator (NDI) for any HARQ buffer, which is stored with RLC packet repetitions triggers removal of all of the remaining replicated RLC packets in the HARQ buffer.

Consider now additional details regarding the grants used for the replication. In some embodiments, it is up to the scheduler to decide what types of grants to use to schedule the repeated packets. In case there is a single grant to schedule multiple replicated packets (i.e., to schedule both the original packet and the replication(s) of the original packet), which may be multiplexed with other logical channel (LCH) data, a multi-slot scheduling framework can be used. Otherwise, the same number of grants are needed to schedule multiple replicated packets (i.e., the number of grants needed is equal to the number of replications including the original packet). TCI state is one parameter associated with different grants instead of per original/replicated packet. Then, whether a TCI state or spatial relation is associated to another TRP may be agnostic to the UE. Thus, it may be up to the network to schedule such grants that the UE knows it will use for the repetitions that will be towards different TRPs. In an alternative, the TCI states or spatial directions are mapped to two groups that each correspond to a TRP. In such a way, the UE can be configured to send the replicates when corresponding grants arrive. Here, a maxwaitTimer can be useful such that if a grant for the other TRP cannot be scheduled, the UE does not wait too long but sends the replicate with the next suitable grant.

Embodiment 2: Multiplexing and its Restriction

For every TTI, the UE will construct a MAC PDU based on the grant size issued in the DCI. If forbidToMupltiplexReplicatesInSameMacPDU is set to true, only one copy of the replicated packet is multiplexed with the data from other logical channels in the same MAC PDU.

In one embodiment, the duplication is performed at the RLC layer, e.g., in accordance with a decision by a scheduler at the MAC layer. In other words, one RLC PDU (once generated) is duplicated into two RLC PDUs. The RLC PDU size is determined by the first grant size that can accommodate the data from this logical channel. Afterwards, another RLC PDU with the same content is created and buffered. This means that both RLC control PDU and RLC data PDU are duplicated, including the headers such as the sequence number, etc.

If #maxNrOfReplication is configured, in one embodiment, the UE decides how many actual replications it generates for each RLC SDU/PDU. The decision is based on the instantaneous channel state. If channel quality is bad, then the UE replicates multiple times up to the indicated maximum number of repetitions. In another case, the network can configure a minimum number of replications that the UE shall generate for each RLC SDU/PDU.

If #maxNrOfReplication is configured, in another embodiment, the gNB scheduler decides how many replications the UE shall generate for each RLC SDU/PDU. The decision may be based on channel measurements in the uplink using SRS/PUSCH/PUCCH transmitted by the UE and/or availability of the data in other logical channels. Here, SRS is a Sounding Reference Signal, PUSCH is a Physical Uplink Shared Channel, and PUCCH is a Physical Uplink Control Channel. The method to control how many replications the UE shall generate for each RLC SDU/PDU can be according to any one of the methods presented in embodiments 3, 4, or 5 below.

Embodiment 3: MAC CEs

MAC CE to Indicate the UE to Start Replication

In one embodiment, it is up to the base station (e.g., base station 402 such as, e.g., a gNB) to decide when to start replication and when to stop a replication by sending a MAC CE indicating "start replicating" and another MAC CE to "stop replicating" based on the instantaneous radio condition. For example, when the radio condition is so poor that a single transmission is not possible to reach the reliability requirement, the base station will trigger "start replicating" by sending the "start replicating MAC CE" to the UE. In one embodiment, the "start replicating" MAC CE includes one bit per logical channel. In one embodiment, the "start replicating" MAC CE provides a "start replicating" command for multiple logical channels with one bit per logical channel in the same MAC CE. When the UE receives the MAC CE with the bit set for a given logical channel, the UE will start replicating RLC data from the buffer or will start constructing a MAC PDU from the same RLC replicated data of the logical channel indicated in the MAC CE.

In one embodiment, the base station sends the 'start replicating MAC CE' as soon as the corresponding logical channel is configured or setup, instead of when data is present for transmission. The UE may not have immediate data to transmit upon configuration or setup of a service, i.e., the data may arrive at a later time. Some other condition might be still needed, for example radio condition. That is because if there is existing data in the logical channel with higher priority than the logical channel with replication, which has lower priority but is more time critical, the arrival of the new data of the logical channel with lower priority will not trigger a regular buffer status report (BSR). Potentially, the base station does not know the presence of the low priority logical channel data. Further, to obtain data availability based on the reception of a BSR will introduce delay, which might be quite long due to a HARQ decoding error. Accordingly, it is more reliable for the base station to configure "start replicating" even if the base station does not receive a BSR showing the presence of the data of the URLLC logical channel. The UE will start replicating the correspondent logical channel data whenever new data arrives in the buffer.

In another embodiment, a MAC CE can indicate the maximum number of replications or the exact number of repetitions that the UE shall generate for each RLC PDU/SDU. In such a case, if the indicated number is one, then duplication/replication is not configured and if the indicated number is larger than one, then duplication/replication is configured. In one variant of this embodiment, the MAC CE may indicate the maximum number of replications or the exact number of repetitions that the UE shall generate for each RLC PDU/SDU for multiple logical channels. For instance, the MAC CE may indicate a first number of replications corresponding to a first logical channel and a second number of replications corresponding to a second logical channel as part of the same MAC CE.

In another alternative, the MAC CE gives also further information on the repetitions to be performed. For example, it may give the forbidToMultiplexReplicatesInSameMacPDU for a logical channel. Or, it may additionally control whether physical layer diversity is applied. Or, it may give maxWaitingTimeForBeingMultiplexed for the logical channel. Any of this may alternatively be given per UE.

MAC CE or One Bit in DCI to Indicate the UE to Stop Replication

In some embodiments, the base station will send "stop multiplexing the replication" upon the occurrence of one or more conditions. For example, one condition may be when the channel condition becomes better and it is possible to reach the required reliability requirement with a single transmission. Another condition may be when the number of replicated transmissions needed to reach the reliability requirement is fewer than the #maxNrOfReplication. Yet another condition is when the packet has been successfully decoded after one or a few replications. Still another condition is when there is no more data in the buffer from other logical channels, In some embodiments, the MAC CE is one bit per logical channel. In some embodiments, the "stop multiplexing the replication" a MAC CE may provide "stop multiplexing the replication" command for multiple logical channels, with one bit per logical channel in the same MAC CE. In other embodiments, the "stop multiplexing the replications" in a MAC CE is one bit indicating stop multiplexing replications for all logical channels. When the UE receives the MAC CE with the bit set for a given logical channel, the UE will remove the remaining replicated RLC data from the buffer and/or will stop constructing a MAC PDU from the same RLC replicated data of the logical channel indicated in the MAC CE. If the scheduler/gNB decides to start scheduling the replicated data again, it will send the MAC CE with the bit unset for the given logical channel.

In another embodiment, a MAC CE can indicate the maximum number of replications or the exact number of replications that UE shall generate for each RLC PDU/SDU. In such a case, if the indicated number is one, then duplication/replication is not configured and if the indicated number is larger than one, then duplication/replication is configured.

In other embodiments, the "stop multiplexing the replication" could be a layer 1 (L1) message, e.g., DCI based.

In yet another embodiment, upon reception of an RLC status PDU indicating a successful RLC data reception, the multiplexing of replicated packets will be stopped and the remaining replicated data will be removed.

Common MAC CE to Indicate the UE to Start Replication or to Stop Replication

In another embodiment, the MAC CE to start replication is the same MAC CE as the one used for "to stop replication" but with the bits unset. That is, for each logical channel, the MAC CE may indicate 1 bit. If the bit is set to 1 for a logical channel, then the UE will start replicating RLC data from the buffer or will start constructing a MAC PDU from the same RLC replicated data of the logical channel indicated in the MAC CE. If the bit is set to 0 for a logical channel, then the UE will remove the remaining replicated RLC data from the buffer and/or will stop constructing a MAC PDU from the same RLC replicated data of the logical channel indicated in the MAC CE. The 'start replicating' or 'stop replicating' commands may be provided for multiple logical channels in the same MAC CE in this embodiment.

The "start replicating" MAC CE may provide a "start replicating" command for multiple logical channels, with one bit per logical channel in the same MAC CE.

BSR

One embodiment is to include replicated data size in a BSR with separate fields. One buffer status report will report the total buffer size of a logical channel group that contains multiple logical channels and the total buffer size of the replicated data of the logical channels within the logical channel group.

Another embodiment is to include the replicated data size in a BSR in the same buffer size including original data and replicated data. The potential risk with this embodiment is that the base station scheduler may over allocate the resources with a single grant, since the gNB does not know how many data is original and how many are replicated.

Yet another embodiment is to not to include the replicated data size in a BSR and only report original data size. In this case, it is up to the network to keep track of the replicated data size based on the number of replications that have been scheduled and/or that are to be scheduled. The base station, based on the reported buffer size of the logical channel to be replicated and the number of replications, performs buffer estimation after replication is performed.

Scheduling Request (SR)

In some embodiments, replicated data typically will not trigger a regular BSR or SR. That is because there is data existing in the buffer. However, if retxBSRTimer has expired, a SR will be triggered even if there is only replicated data in the buffer.

Embodiment 4: Indication Via Multi-Slot Scheduling DCI

In this embodiment, where a DCI schedules multi-slot scheduling, the number of replications is equal to the number of slots scheduled with the DCI.

In NR, for multi-slot scheduling, the number of slots with different TBs is given by the size of the 'pushAllocationList-r16' as specified in 3GPP TS 38.331 V16.1.0 and shown below. Note that the size of PUSCH-TimeDomainResourceAllocationList-r16 represents the number of rows in the time domain resource allocation table wherein each of these rows is associated with a codepoint in the 'Time domain resource assignment' field in uplink-related DCI. Hence, it is possible to configure two different sizes for 'pushAllocationList-r16' which correspond to two different rows in the time domain resource allocation table. Then, the UL-related DCI can trigger different numbers of TBs for multi-slot scheduling (i.e., by triggering different codepoints in the 'Time domain resource assignment' field in the uplink-related DCI). In one embodiment, the number of replications is equal to the number of multi-slots scheduled by the uplink related DCI. Note that the number of replications can be dynamically changed by triggering the uplink related DCI to different rows of the time domain resource allocation table which correspond to different numbers of slots for multi-slot scheduling.

```
PUSCH-TimeDomainResourceAllocationList-r16 ::= SEQUENCE (SIZE(1..maxNrofUL-Allocations-r16))
    OF PUSCH-TimeDomainResourceAllocation-r16
PUSCH-TimeDomainResourceAllocation-r16 ::= SEQUENCE {
    k2-r16                    INTEGER(0..32)           OPTIONAL, -- Need S
    puschAllocationList-r16   SEQUENCE (SIZE(1..maxNrofMultiplePUSCHs-r16)) OF
                                  PUSCH-Allocation-r16,
    ...
}
PUSCH-Allocation-r16 ::=    SEQUENCE {
    mappingType-r16           ENUMERATED {typeA, typeB}   OPTIONAL, -- Cond NotFormat01-02-Or-TypeA
    startSymbolAndLength-r16  INTEGER (0..127)            OPTIONAL, -- Cond NotFormat01-02-Or-TypeA
```

```
startSymbol-r16         INTEGER (0..13)                           OPTIONAL,  -- Cond RepTypeB
length-r16              INTEGER (1..14)                           OPTIONAL,  -- Cond RepTypeB
numberOfRepetitions-r16 ENUMERATED {n1, n2, n3, n4, n7, n8, n12, n16} OPTIONAL,
                          -- Cond Format01-02
...
}
```

One embodiment is that, when multi-slot scheduling (indicated via the uplink related DCI) is used, only the packet of the logical channel that is configured with allow-PacketReplication is duplicated.

In some embodiments, when the number of slots for multi-slot scheduling (indicated via the uplink related DCI) is larger than #maxNrOfReplication, then the number of replications is given by #maxNrOfReplication.

In another embodiment, when the number of slots for multi-slot scheduling (indicated via the uplink related DCI) is smaller than #maxNrOfReplication, then the number of replications is given by the number of slots for multi-slot scheduling.

The PUSCH transmission in a slot of a multi-slot PUSCH transmission may in some cases be omitted when a particular slot collides with a downlink slot or the allocated symbols of that slot collide with downlink symbols. In one embodiment, the omitted slot is not counted as part of the number of replications.

Embodiment 5: Replicated Packets on Configured Grant

For configured grant transmission, it is proposed to support configured grant with multi-slot grant transmission. In such configuration, the replicated packets can be scheduled via multi-slot scheduling of each configured grant. The number of replicates follows embodiment 4.

Another embodiment is that multiple replicated packets are transmitted on multiple configured grant transmissions.

The configured grant activation/deactivation DCI might indicate to start or stop replicate Transmission.

Embodiment 6: Other Logical Channel Configurations

When packet replication is supported for a logical channel, each replicated packet (e.g., URLLC) can be concatenated with other data (e.g., eMBB) to build a TB for physical layer transmission. While the TB contains data of different requirements (e.g., URLLC and eMBB), it is necessary that the configurations are determined by the higher requirements (e.g., URLLC), even though the eMBB data can tolerate more relaxed requirements in terms of latency.

For example, 'Priority' (i.e., logical channel priority) is determined by that of the URLLC packet, 'allowedPHY-PriorityIndex' is designated as 'high priority', 'maxPUSCH-Duration' is determined by that of the URLLC packet, e.g., a shorter duration that satisfies the low latency requirement, and/or 'allowedSCS-List' is determined by that of the URLLC packet, e.g., using higher subcarrier spacing (SCS) (e.g., >=30 kHz) rather than lower SCS (e.g., 15 kHz) to better satisfy the low latency requirement of URLLC.

Embodiment 7: Methods to Ensure Independent Transmission of the Replicated Packets When a packet is duplicated and mapped to two or more transport blocks, some embodiments implement mechanisms to ensure that these transport blocks experience uncorrelated transmission. Otherwise, the two transport blocks may both fail or succeed, defeating the purpose of providing diversity.

Diversity via Multi-TRP.

In one example, the duplicated packets are required to be mapped to two different transmission/reception points (TRPs). This can be realized by introducing a new restriction for a repetition scheme in the logical channel configuration. The repetition scheme of the multi-TRP can be frequency-division multiplexing (FDM) based or time-division multiplexing (TDM) based. If TDM based, the scheme can be further designed as a mini-slot based or slot-based repetition scheme.

To ensure diversity via multi-TRP in the UL, the following restriction can be introduced in the logical channel configuration: 'allowedRepetitionScheme', with possible values of 'FDM', 'TDM'. If this parameter is absent, it means that there is no restriction in terms of multi-TRP usage.

Since the duplicated packets are passed to the physical layer as two separate transport blocks, multi-DCI based non-coherent joint transmission (NC-JT) can be used, with two TBs being scheduled by two separate DCI and transmitted via two separate TRPs.

Preferably, diversity via multi-TRP is enabled for both downlink transmission and uplink transmission. However, it is more challenging for UE implementation to realize uplink multi-TRP scheme. Hence in some systems, only downlink multi-TRP is available to provide diversity, whereas uplink transmission is supported by other schemes.

Diversity Via Different Beams

In one example, the duplicated packets are required to be mapped to two different beams. The two beams may be transmitted simultaneously via two different sets of antenna ports. Alternatively, the two beams may be transmitted sequentially in time (e.g., beam sweeping). In more advanced schemes, the two TBs are each transmitted multiple times, alternating with different beams (or antenna ports, or TCI states), and/or different time instances, and/or different frequency locations.

Diversity Via Different BWP

In another example, the diversity between the two TBs (which carry the same URLLC packet) is achieved by transmitting the two TB on two different bandwidth parts (BWPs). A BWP as used herein refers to a part (i.e., subset) of the total cell bandwidth of a cell. This requires two or more different BWPs being activated on a single cell. This can be used for downlink and/or downlink transmissions. Different BWPs might be configured with different numerologies, with which different reliability at different BWPs can be achieved.

Alternative Embodiment

Figure 5:
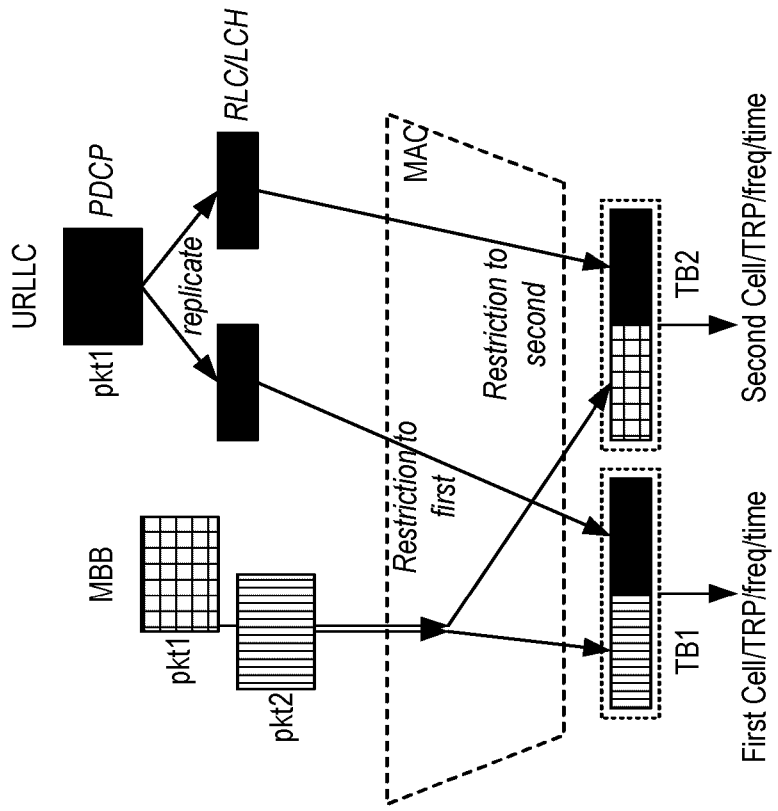
FIG. 5 is a block diagram of packet replication according to other embodiments.

In an alternative embodiment to the above, the replication is not done per logical channel, but instead is done on a radio bearer level, i.e. PDCP duplicates packets of a certain service, e.g. URLLC, and provides the duplicates to different RLC entities associated with different LCHs. From the MAC perspective, URLLC replicated data appears thus in different LCHs. These LCHs are configured with restrictions to transmit each only on a certain cell/TRP/frequency/time. This restriction is not applied to another logical channel that carries e.g. MBB data. When multiplexing data to different TBs, URLLC replicates are thus used in each TB, while different MBB data is multiplexed together with those URLLC replicates. An example of this embodiment is shown in FIG. 5.

In some embodiments, a LCH restriction for a certain TRP or Multiple-Input Multiple-Output (MIMO) layer is applied in the MAC layer. One example is that the restriction can be that LCH #1 can only be mapped to the first MIMO layer and LCH #2 can only be mapped to the second MIMO layer, where LCH #1 and LCH #2 are associated with the same URLLC PDCP PDU. In this case, the restriction is applied only when the grant indicates a multi-layer UL transmission (i.e., a grant that can accommodate multiple TBs). If the UL transmission is a single layer, then the restriction is not applied. As another example, a replicated LCH may have the same LCH property but be marked as "replicated" LCH. It is then up the scheduler to decide on which cell/TRP/freq/time this replicated LCH should be sent, for which a MAC CE or DCI indicates. As still another example, the LCH #x are mapped to certain TCI states or spatial directions that correspond to certain TRPs. There could be for example 10 TCI states configured and 5 could correspond to each TRP.

Alternatively or additionally, in some embodiments, a MAC CE or DCI signaling may be configured to change this LCH restriction.

Alternatively or additionally, for BSR reporting, an indication in some embodiments can be included in a BSR report if data of the replicated LCH is reported, i.e. marking BSR for this LCH with 1 bit. This way, the gNB scheduler is informed of whether original or duplicated data is available in the UE and can adjust its scheduling, i.e. ensure that original and replicated data is scheduled on different resources to maximize diversity.

Application to URLLC and eMBB

Some embodiments herein are applicable for meeting URLLC requirements specified for New Radio (NR) by the Third Generation Partnership Project (3GPP). URLLC requirements are intended to handle a variety of new demanding wireless use cases. Such use cases appear in the automotive safety field, in factory automation, as well as when augmented and virtual reality functionality with tactile feedback are run over NR. Table 1 summarizes parts of the current URLLC requirements in 3GPP.

TABLE 1

3GPP delay and reliability requirement examples

| Use Case | End-to-End Delay | Jitter | Reliability |
|---|---|---|---|
| Discrete automation: motion control | 1 ms | 1 μs | 99.9999% |
| Discrete automation | 10 ms | 100 μs | 99.99% |
| Process automation: remote control | 50 ms | 20 ms | 99.9999% |
| Process automation: monitoring | 50 ms | 20 ms | 99.9% |
| Electricity distribution: medium voltage | 25 ms | 25 ms | 99.9% |

TABLE 1-continued

3GPP delay and reliability requirement examples

| Use Case | End-to-End Delay | Jitter | Reliability |
|---|---|---|---|
| Electricity distribution: high voltage | 5 ms | 1 ms | 99.9999% |
| Intelligent transport systems: infrastructure backhaul | 10 ms | 20 ms | 99.9999% |
| Tactile interaction | 0.5 ms | To be confirmed | 99.999% |

The performance requirements are then enhanced, from Fourth Generation (4G) mobile broadband capacity/spectral efficiency requirements, to also include stringent requirements on round trip latency and reliability. Typically, the latency requirements reach sub-millisecond figures, and the reliability requirements reach packet loss probabilities as low as $10^{-6}$–$10^{-4}$.

To achieve these reliability requirements, URLLC data may be transmitted over multiple independent wireless interfaces, e.g., running URLLC using some kind of multi-point transmission. In particular, URLLC data may be transmitted over at least three multi-path connections, i.e. the current dual connectivity functionality may be insufficient.

Reliability Impairments for C-MTC Feedback Control Applications

Some embodiments herein are applicable for the so-called Critical Machine Type Communications (C-MTC) use case. Typical applications in this class include tactile feedback for virtual reality applications that allow users to sense remote objects, safety critical automotive safety application like automatic braking and platooning, as well as industrial robot control where manufacturing flexibility is obtained by replacement of wired feedback control loops, by wireless ones.

These applications all share a requirement to meet both the reliability requirement in terms of lost packets, at the same time as the delay and jitter requirements are met. A packet loss is defined as either a lost packet or a packet received at the application layer reception point with longer delay than the delay budget required. In this context, it is very important to understand that a property of control loops is the requirement for real time feedback, meaning that a late control or feedback signal is in effect a lost piece of data! This is so since feedback control actions need to be based on the current system state. Delayed actions or measurements give past information, and it is well known that delay in feedback control systems can easily lead to instability. The consequence of the above is that the likelihood of excessively delayed packets needs to be accounted for when assessing reliability for C-MTC and URLLC applications.

URLLC Related Technologies

Some embodiments herein are applicable to the NR standard in 3GPP, which is being designed to provide service for multiple use cases such as enhanced Mobile Broadband (eMBB), URLLC, and Machine Type Communication (MTC). These services have different technical requirements. For example, the general requirements for eMBB include a high data rate with moderate latency and moderate coverage, while URLLC services require simultaneous (very) low latency and (very) high reliability transmission but perhaps for moderate data rates.

One of the solutions in 3GPP for low latency data transmission is shorter transmission time intervals. In NR, in addition to transmission in a slot, a mini-slot transmission is also allowed to reduce latency. A mini-slot may consist of any number of 1 to 14 Orthogonal Frequency Division Multiplexing (OFDM) symbols. It should be noted that the concepts of slots and mini-slots are not specific to a specific service meaning that a mini-slot may be used for either eMBB, URLLC, or other services. In addition to this, NR brings high band carrier frequencies to the wireless field, including new numerologies that offer up to 16 times wider subcarrier frequencies, together with up to 16 times finer time granularity. The latter property makes millimeter wave (mmW) technology particularly useful for URLLC.

Of course, although embodiments herein have been exemplified with URLLC and/or eMBB, these are non-limiting examples. eMBB is just an example of traffic that has less critical latency and reliability requirement. Embodiments herein are also applicable for other non-eMBB traffic that has relaxed latency and reliability requirement that coexists with the URLLC type of service.

Additional Description

Figure 6:
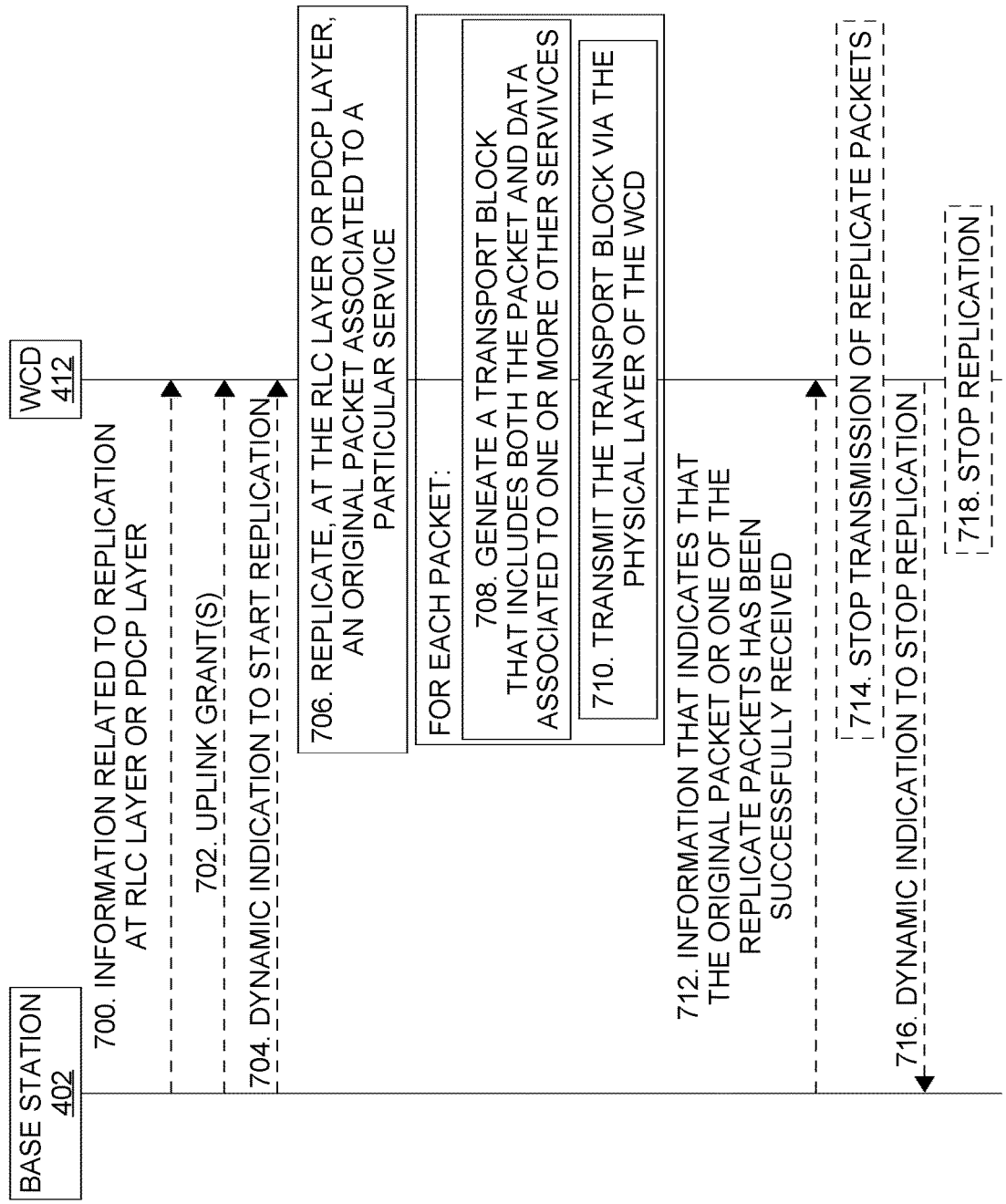
FIG. 6 is a call flow diagram for operation of a base station and a wireless communication device according to some embodiments.

FIG. 6 illustrates the operation of a base station 402 and a wireless communication device (WCD) 412 in accordance with at least some aspects of Embodiments 1 to 7 and the Alternative Embodiment described above. Optional steps are represented by dashed lines/boxes. As discussed above, the base station 402 may provide information related to replication at the RLC layer or PDCP layer to the wireless communication device 412 (step 700). As discussed above, in one embodiment, replication is at the RLC layer, and this information includes (a) information that indicates that replication is allowed for one or more logical channels (e.g., all logical channels, a subset of all logical channels, or a particular logical channel for which replication is desired), (b) information that indicates a maximum number of replications allowed for the logical channel(s) at the RLC layer, (c) information that indicates a fixed number of replications allowed for the logical channel(s) at the RLC layer, (d) information that indicates that multiplexing of any of an original RLC packet and one or more replicate RLC packets of the original RLC packet in a same MAC PDU is not allowed, (e) information that indicates whether physical layer diversity is to be used for transmission of the original RLC packet and the one or more replicate RLC packets, or (f) a combination of any two or more of (a)-(e). As discussed above, this information may be signaled to the wireless communication device 412 via semi-static signaling (e.g., RRC signaling), dynamic signaling (e.g., MAC CE signaling or DCI), or a combination thereof.

As discussed above, in one embodiment, the base station 402 provides, to the wireless communication device 412, one or more uplink grants that scheduled uplink resources that are used for transmission of an original packet and one or more replicate packets of the original packet (step 702). In one embodiment, a single uplink grant is provided (e.g., a semi-persistent scheduling grant). In another embodiment, separate grants are provided for the original packet and the replicate packets.

As also discussed above, in one embodiment, the base station 402 sends, to the wireless communication device 412, a dynamic indication to start replication at the RLC layer for a particular logical channel associated to a particular service (e.g., a URLLC service) or to start replication at the PDCP layer for packets associated to the particular service (step 704). This dynamic indication may be sent via MAC CE or DCI, as described above.

At the wireless communication device 412, the wireless communication device 412 replicates, either at the RLC layer or at the PDCP layer, an original packet associated to the particular service to provide one or more replicate packets, each being a replication of the original packet, as described above (step 706). For each of the original packet and the replicate packets, the wireless communication device 412 generates a transport block that includes the packet and possibly data associated to one or more other services (e.g., eMBB) (step 708), and the transport block is provided to the physical layer for transmission (step 710). In other words, each packet (from among the original and the replicates) is included in a respective transport block. Further, in some or all of these transport blocks, the respective packet may be multiplexed with data for the one or more other services (e.g., if such data is waiting to be transmitted), as described above.

As described above, if replication is at the RLC layer, the original/replicate RLC packet is associated to a particular logical channel that is associated to the particular service for which replication is being performed. For each original/replicate RLC packet for that particular logical channel, the original/replicate RLC packet may be multiplexed with one or more other RLC packets for the one or more other services in the same MAC PDU/transport block.

Conversely, if replication is at the PDCP layer, the original packet is associated to a radio bearer that is associated to the particular service. The original packet is replicated at the PDCP layer, and the original PDCP packet and the replicate PDCP packets are then processed by different RLC layers that are associated to different logical channels each being restricted to being transmitted on different cells, to different TRPs, on different MIMO layers, on different frequency resources (e.g., BWPs), and/or on different time resources. The respective RLC packets may then be multiplexed, at the MAC layer, with other RLC packets associated to one or more other services.

Further, regardless of whether replication is at the RLC layer or the PDCP layer, physical layer diversity is used for the original packet and the replicate packets in some embodiments, as described above.

In one embodiment, while the replicate packets are being transmitted, the wireless communication device 412 receives information that indicates that the original packet or one of the transmitted replicates has been successfully received (step 712). In response, the wireless communication device 412 stops transmission of any further replicate packets (step 714) and may delete the remaining un-transmitted packets from storage. As discussed above, in an embodiment in which replication is at the RLC layer and RLC AM is used, the information received in step 712 may be an RLC status report that includes an ACK for the original packet. Note that the RLC status report may be such that it only includes ACKs/NACKs for original packets (and not for replicate packets), as described above. In another embodiment, replication is at the RLC layer and RLC segmentation is not used, and the information received in step 712 is a DCI including a toggled NDI associated to a HARQ buffer storing the replicate packets.

In one embodiment, as described above, the base station 402 may send a dynamic indication to the wireless communication device 412 to stop replication at the RLC layer for the particular logical channel associated to the particular service or to stop replication at the PDCP layer for data associated to the particular service (step 716). This dynamic indication may be via MAC CE or DCI. Upon receiving this dynamic indication the wireless communication device 412 stops replication at the RLC layer for the particular logical channel associated to the particular service or to stops replication at the PDCP layer for data associated to the particular service (step 718).

Figure 7:
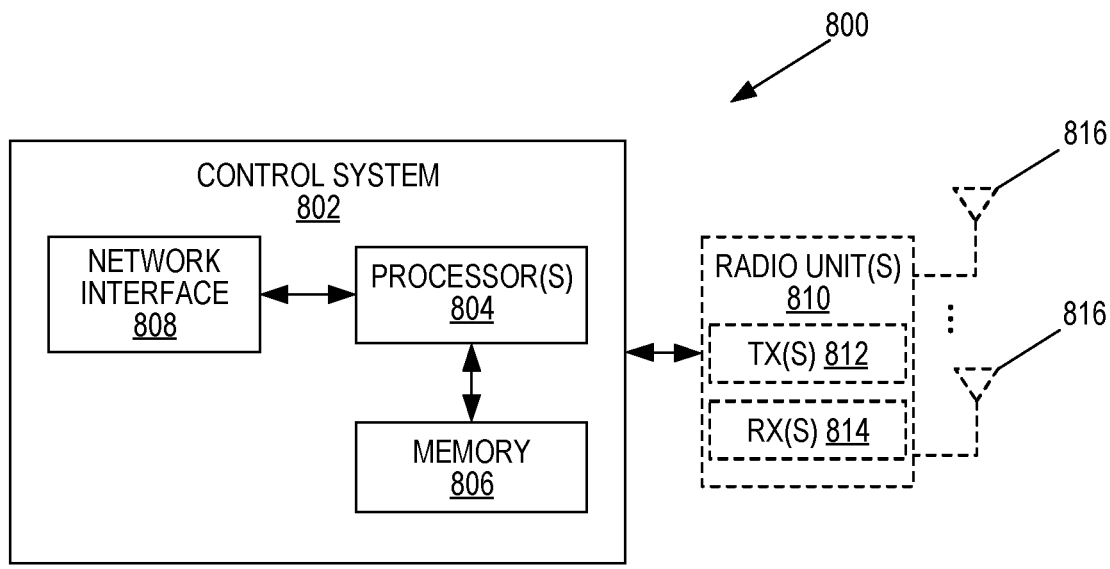
FIG. 7 is a block diagram of a radio access node according to some embodiments.

FIG. 7 is a schematic block diagram of a radio access node 800 according to some embodiments of the present disclosure. Optional features are represented by dashed boxes. The radio access node 800 may be, for example, a base station 402 or 406 or a network node that implements all or part of the functionality of the base station 402 or gNB described herein. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the radio access node 800 may include one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of the radio access node 800 as described herein (e.g., one or more functions of the base station 402 or gNB as described herein with respect to Embodiments #1 to #7, the Alternative Embodiment, and FIG. 6). In some embodiments, the function(s) are implemented in software that is stored, e.g., in the memory 806 and executed by the one or more processors 804.

Figure 8:
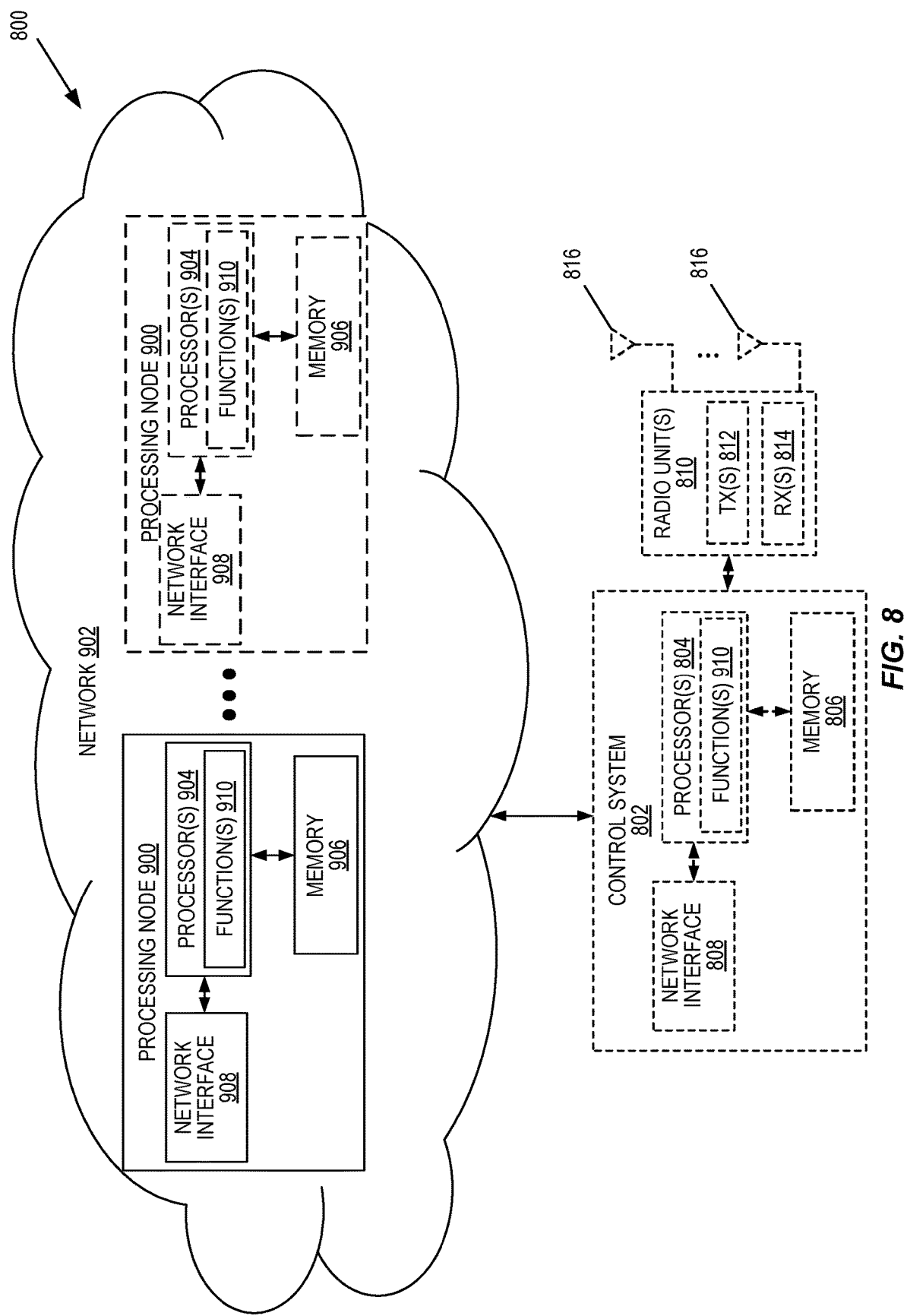
FIG. 8 is a block diagram of a virtualized embodiment of a radio access node according to some embodiments.

FIG. 8 is a schematic block diagram that illustrates a virtualized embodiment of the radio access node 800 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 may include the control system 802 and/or the one or more radio units 810, as described above. The control system 802 may be connected to the radio unit(s) 810 via, for example, an optical cable or the like. The radio access node 800 includes one or more processing nodes 900 coupled to or included as part of a network(s) 902. If present, the control system 802 or the radio unit(s) are connected to the processing node(s) 900 via the network 902. Each processing node 900 includes one or more processors 904 (e.g., CPUs, ASICs, FPGAs, and/or the like), memory 906, and a network interface 908.

In this example, functions 910 of the radio access node 800 described herein (e.g., one or more functions of the base station 402 or gNB as described herein with respect to Embodiments #1 to #7, the Alternative Embodiment, and FIG. 6) are implemented at the one or more processing nodes 900 or distributed across the one or more processing nodes 900 and the control system 802 and/or the radio unit(s) 810 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of radio access node 800 or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
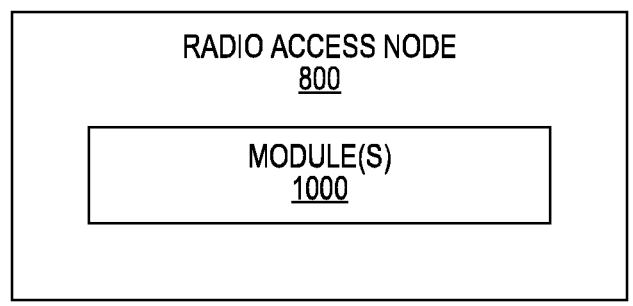
FIG. 9 is a block diagram of a radio access node according to other embodiments.

FIG. 9 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein (e.g., one or more functions of the base station 402 or gNB as described herein with respect to Embodiments #1 to #7, the Alternative Embodiment, and FIG. 6). This discussion is equally applicable to the processing node 900 of FIG. 8 where the modules 1000 may be implemented at one of the processing nodes 900 or distributed across multiple processing nodes 900 and/or distributed across the processing node(s) 900 and the control system 802.

Figure 10:
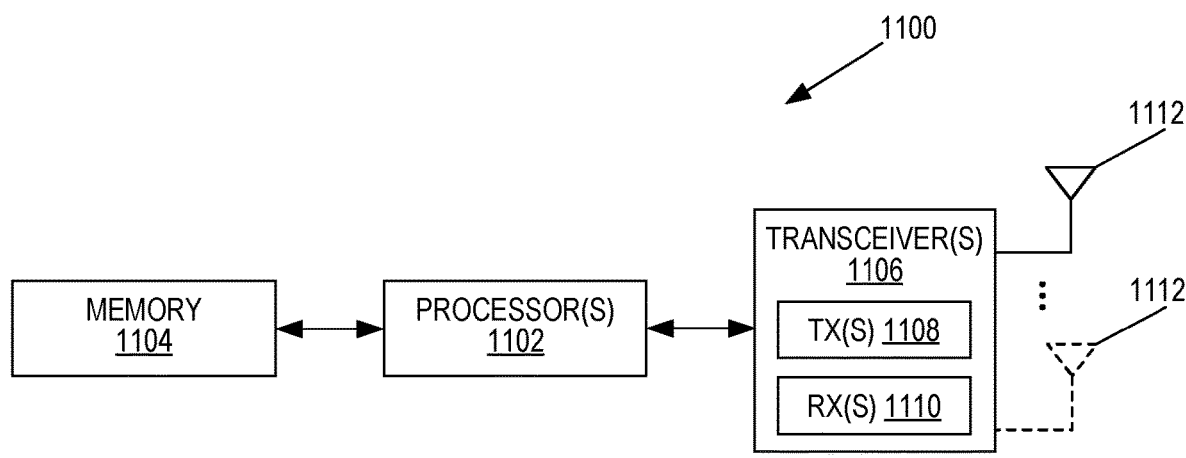
FIG. 10 is a block diagram of a wireless communication device according to some embodiments.

FIG. 10 is a schematic block diagram of a wireless communication device 1100 according to some embodiments of the present disclosure. As illustrated, the wireless communication device 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by on of ordinary skill in the art. The processors 1102 are also referred to herein as processing circuitry. The transceivers 1106 are also referred to herein as radio circuitry. In some embodiments, the functionality of the wireless communication device 1100 described above (e.g., one or more functions of the wireless communication device Q112 or UE as described herein with respect to Embodiments #1 to #7, the Alternative Embodiment, and FIG. 6) may be fully or partially implemented in software that is, e.g., stored in the memory 1104 and executed by the processor(s) 1102. Note that the wireless communication device 1100 may include additional components not illustrated in FIG. 10 such as, e.g., one or more user interface components (e.g., an input/output interface including a display, buttons, a touch screen, a microphone, a speaker(s), and/or the like and/or any other components for allowing input of information into the wireless communication device 1100 and/or allowing output of information from the wireless communication device 1100), a power supply (e.g., a battery and associated power circuitry), etc.

In some embodiments, a computer program including instructions which, when executed by at least one processor, causes the at least one processor to carry out the functionality of the wireless communication device 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
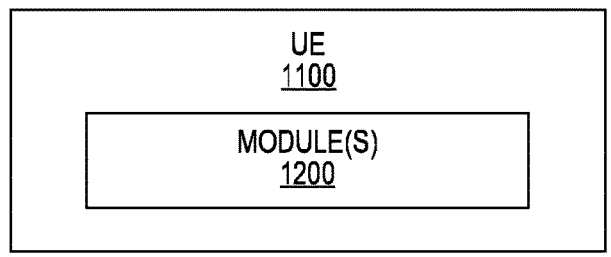
FIG. 11 is a block diagram of a wireless communication device according to other embodiments.

FIG. 11 is a schematic block diagram of the wireless communication device 1100 according to some other embodiments of the present disclosure. The wireless communication device 1100 includes one or more modules 1200, each of which is implemented in software. The module(s) 1200 provide the functionality of the wireless communication device 1100 described herein (e.g., one or more functions of the wireless communication device Q112 or UE as described herein with respect to Embodiments #1 to #7, the Alternative Embodiment, and FIG. 6).

Figure 12:
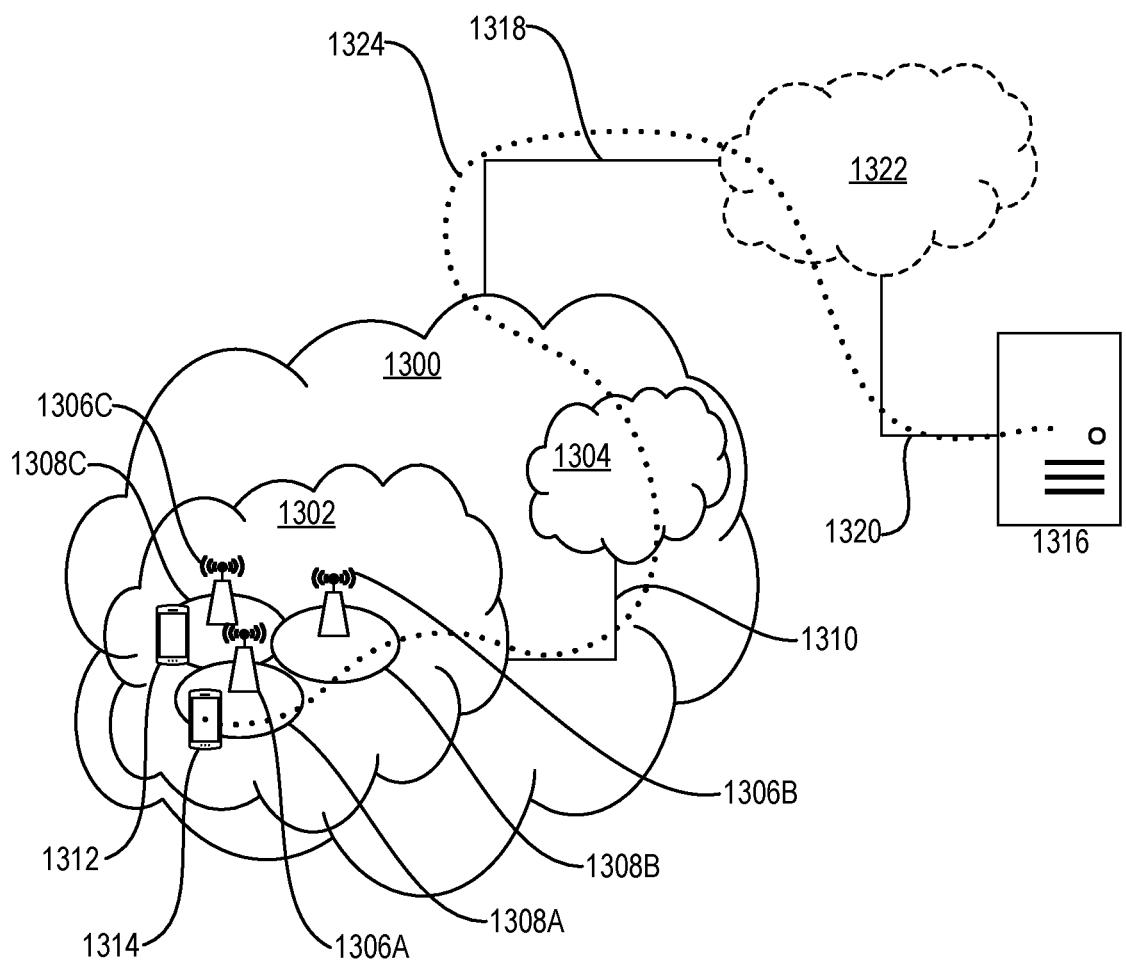
FIG. 12 is a block diagram of a communication system that includes a telecommunication network according to some embodiments.

With reference to FIG. 12, in accordance with an embodiment, a communication system includes a telecommunication network 1300, such as a 3GPP-type cellular network, which comprises an access network 1302, such as a RAN, and a core network 1304. The access network 1302 comprises a plurality of base stations 1306A, 1306B, 1306C, such as Node Bs, eNBs, gNBs, or other types of wireless Access Points (APs), each defining a corresponding coverage area 1308A, 1308B, 1308C. Each base station 1306A, 1306B, 1306C is connectable to the core network 1304 over a wired or wireless connection 1310. A first UE 1312 located in coverage area 1308C is configured to wirelessly connect to, or be paged by, the corresponding base station 1306C. A second UE 1314 in coverage area 1308A is wirelessly connectable to the corresponding base station 1306A. While a plurality of UEs 1312, 1314 are illustrated in this example, the disclosed embodiments are equally applicable to a situation where a sole UE is in the coverage area or where a sole UE is connecting to the corresponding base station 1306.

The telecommunication network 1300 is itself connected to a host computer 1316, which may be embodied in the hardware and/or software of a standalone server, a cloud-implemented server, a distributed server, or as processing resources in a server farm. The host computer 1316 may be under the ownership or control of a service provider, or may be operated by the service provider or on behalf of the service provider. Connections 1318 and 1320 between the telecommunication network 1300 and the host computer 1316 may extend directly from the core network 1304 to the host computer 1316 or may go via an optional intermediate network 1322. The intermediate network 1322 may be one of, or a combination of more than one of, a public, private, or hosted network; the intermediate network 1322, if any, may be a backbone network or the Internet; in particular, the intermediate network 1322 may comprise two or more sub-networks (not shown).

The communication system of FIG. 12 as a whole enables connectivity between the connected UEs 1312, 1314 and the host computer 1316. The connectivity may be described as an Over-the-Top (OTT) connection 1324. The host computer 1316 and the connected UEs 1312, 1314 are configured to communicate data and/or signaling via the OTT connection 1324, using the access network 1302, the core network 1304, any intermediate network 1322, and possible further infrastructure (not shown) as intermediaries. The OTT connection 1324 may be transparent in the sense that the participating communication devices through which the OTT connection 1324 passes are unaware of routing of uplink and downlink communications. For example, the base station 1306 may not or need not be informed about the past routing of an incoming downlink communication with data originating from the host computer 1316 to be forwarded (e.g., handed over) to a connected UE 1312. Similarly, the base station 1306 need not be aware of the future routing of an outgoing uplink communication originating from the UE 1312 towards the host computer 1316.

Example implementations, in accordance with an embodiment, of the UE, base station, and host computer discussed in the preceding paragraphs will now be described with reference to FIG. 13. In a communication system 1400, a host computer 1402 comprises hardware 1404 including a communication interface 1406 configured to set up and maintain a wired or wireless connection with an interface of a different communication device of the communication system 1400. The host computer 1402 further comprises processing circuitry 1408, which may have storage and/or processing capabilities. In particular, the processing circuitry 1408 may comprise one or more programmable processors, ASICs, FPGAs, or combinations of these (not shown) adapted to execute instructions. The host computer 1402 further comprises software 1410, which is stored in or accessible by the host computer 1402 and executable by the processing circuitry 1408. The software 1410 includes a host application 1412. The host application 1412 may be operable to provide a service to a remote user, such as a UE 1414 connecting via an OTT connection 1416 terminating at the UE 1414 and the host computer 1402. In providing the service to the remote user, the host application 1412 may provide user data which is transmitted using the OTT connection 1416.

The communication system 1400 further includes a base station 1418 provided in a telecommunication system and comprising hardware 1420 enabling it to communicate with the host computer 1402 and with the UE 1414. The hardware 1420 may include a communication interface 1422 for setting up and maintaining a wired or wireless connection with an interface of a different communication device of the communication system 1400, as well as a radio interface 1424 for setting up and maintaining at least a wireless connection 1426 with the UE 1414 located in a coverage area (not shown in FIG. 13) served by the base station 1418. The communication interface 1422 may be configured to facilitate a connection 1428 to the host computer 1402. The connection 1428 may be direct or it may pass through a core network (not shown in FIG. 13) of the telecommunication system and/or through one or more intermediate networks outside the telecommunication system. In the embodiment shown, the hardware 1420 of the base station 1418 further includes processing circuitry 1430, which may comprise one or more programmable processors, ASICs, FPGAs, or combinations of these (not shown) adapted to execute instructions. The base station 1418 further has software 1432 stored internally or accessible via an external connection.

The communication system 1400 further includes the UE 1414 already referred to. The UE's 1414 hardware 1434 may include a radio interface 1436 configured to set up and maintain a wireless connection 1426 with a base station serving a coverage area in which the UE 1414 is currently located. The hardware 1434 of the UE 1414 further includes processing circuitry 1438, which may comprise one or more programmable processors, ASICs, FPGAs, or combinations of these (not shown) adapted to execute instructions. The UE 1414 further comprises software 1440, which is stored in or accessible by the UE 1414 and executable by the processing circuitry 1438. The software 1440 includes a client application 1442. The client application 1442 may be operable to provide a service to a human or non-human user via the UE 1414, with the support of the host computer 1402. In the host computer 1402, the executing host application 1412 may communicate with the executing client application 1442 via the OTT connection 1416 terminating at the UE 1414 and the host computer 1402. In providing the service to the user, the client application 1442 may receive request data from the host application 1412 and provide user data in response to the request data. The OTT connection 1416 may transfer both the request data and the user data. The client application 1442 may interact with the user to generate the user data that it provides.

Figure 13:
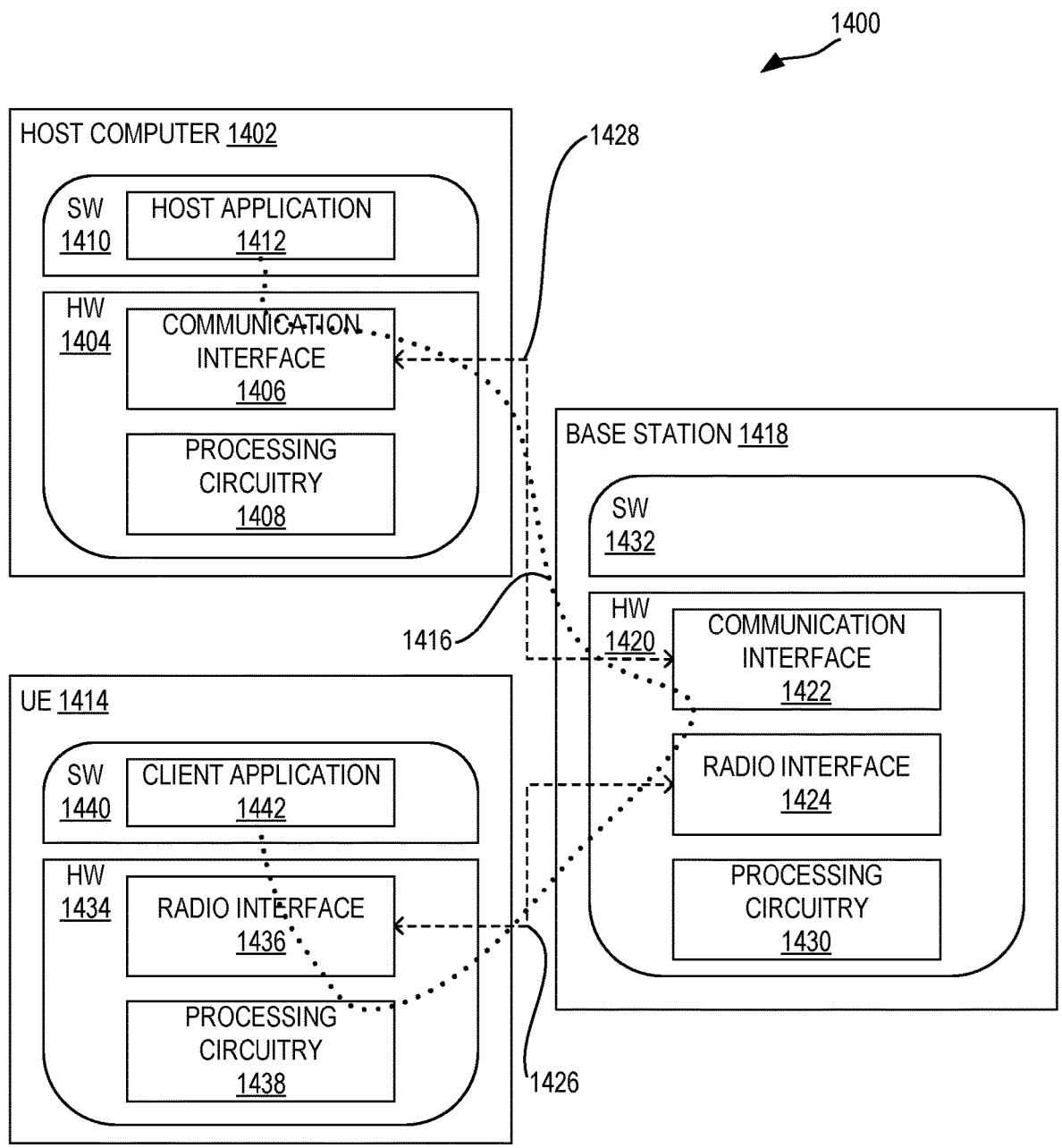
FIG. 13 is a block diagram of a user equipment, base station, and host computer according to some embodiments.

It is noted that the host computer 1402, the base station 1418, and the UE 1414 illustrated in FIG. 13 may be similar or identical to the host computer 1316, one of the base stations 1306A, 1306B, 1306C, and one of the UEs 1312, 1314 of FIG. 12, respectively. This is to say, the inner workings of these entities may be as shown in FIG. 13 and independently, the surrounding network topology may be that of FIG. 12.

In FIG. 13, the OTT connection 1416 has been drawn abstractly to illustrate the communication between the host computer 1402 and the UE 1414 via the base station 1418 without explicit reference to any intermediary devices and the precise routing of messages via these devices. The network infrastructure may determine the routing, which may be configured to hide from the UE 1414 or from the service provider operating the host computer 1402, or both. While the OTT connection 1416 is active, the network infrastructure may further take decisions by which it dynamically changes the routing (e.g., on the basis of load balancing consideration or reconfiguration of the network).

The wireless connection 1426 between the UE 1414 and the base station 1418 is in accordance with the teachings of the embodiments described throughout this disclosure. One or more of the various embodiments improve the performance of OTT services provided to the UE 1414 using the OTT connection 1416, in which the wireless connection 1426 forms the last segment.

A measurement procedure may be provided for the purpose of monitoring data rate, latency, and other factors on which the one or more embodiments improve. There may further be an optional network functionality for reconfiguring the OTT connection 1416 between the host computer 1402 and the UE 1414, in response to variations in the measurement results. The measurement procedure and/or the network functionality for reconfiguring the OTT connection 1416 may be implemented in the software 1410 and the hardware 1404 of the host computer 1402 or in the software 1440 and the hardware 1434 of the UE 1414, or both. In some embodiments, sensors (not shown) may be deployed in or in association with communication devices through which the OTT connection 1416 passes; the sensors may participate in the measurement procedure by supplying values of the monitored quantities exemplified above, or supplying values of other physical quantities from which the software 1410, 1440 may compute or estimate the monitored quantities. The reconfiguring of the OTT connection 1416 may include message format, retransmission settings, preferred routing, etc.; the reconfiguring need not affect the base station 1418, and it may be unknown or imperceptible to the base station 1418. Such procedures and functionalities may be known and practiced in the art. In certain embodiments, measurements may involve proprietary UE signaling facilitating the host computer 1402's measurements of throughput, propagation times, latency, and the like. The measurements may be implemented in that the software 1410 and 1440 causes messages to be transmitted, in particular empty or 'dummy' messages, using the OTT connection 1416 while it monitors propagation times, errors, etc.

FIG. 14 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 14 will be included in this section. In step 1500, the host computer provides user data. In sub-step 1502 (which may be optional) of step 1500, the host computer provides the user data by executing a host application. In step 1504, the host computer initiates a transmission carrying the user data to the UE. In step 1506 (which may be optional), the base station transmits to the UE the user data which was carried in the transmission that the host computer initiated, in accordance with the teachings of the embodiments described throughout this disclosure. In step 1508 (which may also be optional), the UE executes a client application associated with the host application executed by the host computer.

FIG. 15 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 15 will be included in this section. In step 1600 of the method, the host computer provides user data. In an optional sub-step (not shown) the host computer provides the user data by executing a host application. In step 1602, the host computer initiates a transmission carrying the user data to the UE. The transmission may pass via the base station, in accordance with the teachings of the embodiments described throughout this disclosure. In step 1604 (which may be optional), the UE receives the user data carried in the transmission.

FIG. 16 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 16 will be included in this section. In step 1700 (which may be optional), the UE receives input data provided by the host computer. Additionally or alternatively, in step 1702, the UE provides user data. In sub-step 1704 (which may be optional) of step 1700, the UE provides the user data by executing a client application. In sub-step 1706 (which may be optional) of step 1702, the UE executes a client application which provides the user data in reaction to the received input data provided by the host computer. In providing the user data, the executed client application may further consider user input received from the user. Regardless of the specific manner in which the user data was provided, the UE initiates, in sub-step 1708 (which may be optional), transmission of the user data to the host computer. In step 1710 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 17 will be included in this section. In step 1800 (which may be optional), in accordance with the teachings of the embodiments described throughout this disclosure, the base station receives user data from the UE. In step 1802 (which may be optional), the base station initiates transmission of the received user data to the host computer. In step 1804 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. In this regard, the following definitions are given.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the description.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Indeed, some of the embodiments contemplated herein are described with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Example embodiments of the techniques and apparatus described herein include, but are not limited to, the following enumerated examples:

Group A Embodiments

1. A method performed by a wireless communication device (412), the method comprising:
  replicating (706), at either an RLC layer or PDCP layer of a protocol stack of the wireless communication device (412), an original packet associated to a particular service to provide one or more replicate packets each being a replication of the original packet;
  for each packet from among a set of packets consisting of the original packet and at least one of the one or more replicate packets:
    generating (708) a transport block that comprises the packet; and
    transmitting (710) the transport block to one or more base stations or transmission/reception points, TRPs, via a physical layer of the protocol stack of the wireless communication device (412).
2. The method of embodiment 1 wherein at least one of the generated transport blocks further comprises data associated to one or more other services that is multiplexed within the transport block with the respective packet.
3. The method of embodiment 1 or 2 wherein:
  replicating (706) the original packet comprises replicating the original packet at the RLC layer;
  the original packet is an original RLC packet associated to a particular logical channel that is associated to the particular service;
  the one or more replicate packets are one or more replicate RLC packets each being a replication of the original RLC packet.
4. The method of embodiment 3 wherein, for each RLC packet from among at least one of the set of packets, generating (708) the transport block for the RLC packet comprises multiplexing the RLC packet and one or more additional RLC packets that are associated to one or more other logical channels in the transport block.
5. The method of embodiment 3 or 4 further comprising receiving (700), from a network node, information related to replication of packets at the RLC layer.
6. The method of embodiment 5 wherein the information related to replication of packets at the RLC layer is applicable to one or more logical channels including the particular logical channel.
7. The method of embodiment 6 wherein the one or more logical channels are all logical channels.
8. The method of embodiment 6 or 7 wherein the information comprises:
  a) information that indicates that replication is allowed for the one or more logical channels;
  b) information that indicates a maximum number of replications allowed for the one or more logical channels at the RLC layer;
  c) information that indicates a fixed number of replications allowed for the one or more logical channels at the RLC layer;
  d) information that indicates that multiplexing of any original RLC packet and one or more replicate RLC packets of the original RLC packet in a same MAC PDU is not allowed;
  e) information that indicates whether physical layer diversity is to be used for transmission of an original RLC packet and one or more replicate RLC packets of the original packet; or
  f) a combination of two or more of (a)-(e).
9. The method of any of embodiments 5 to 8 wherein receiving (700) the information comprises receiving (700) at least some of the information via RRC signaling.
10. The method of any of embodiments 5 to 9 wherein receiving (700) the information comprises receiving (700) at least some of the information via dynamic signaling (e.g., MAC CE and/or DCI).
11. The method of any of embodiments 3 to 10 further comprising, before all of the one or more replicate RLC packets have been transmitted:
  receiving (712), from a network node, information that indicates that the original RLC packet or one of the one or more replicate RLC packets has been successfully received by the network node; and
  stopping (702) transmission of those of the one or more replicate RLC packets that have not yet been transmitted.
12. The method of embodiment 11 wherein the particular logical channel is configured with RLC Acknowledgement Mode, AM, together with repetitions, and receiving (712) the information that indicates that the original RLC packet or one of the one or more replicate RLC packets has been successfully received by the network node comprises receiving an RLC status report that indicates that the original RLC packet or one of the one or more replicate RLC packets has been successfully received by a respective RLC entity at the network node.

13. The method of embodiment 12 wherein the RLC status report includes an ACK for the original RLC packet but does not include ACK/NACKs for any of the replicate RLC packets.

14. The method of embodiment 11 wherein RLC segmentation is not used, and receiving (712) the information that indicates that the original RLC packet or one of the one or more replicate RLC packets has been successfully received by the network node comprises receiving a DCI that indicates a toggled NDI for a HARQ buffer associated to the one or more replicate RLC packets.

15. The method of any of embodiments 3 to 14 further comprising receiving (702) one or more uplink grants scheduling the original RLC packet and the one or more replicate RLC packets.

16. The method of embodiment 15 wherein the one or more uplink grants is a single semi-persistent uplink grant.

17. The method of embodiment 15 wherein the one or more uplink grants comprise a separate uplink grant for each of the original RLC packet and the one or more replicate RLC packets.

18. The method of any of embodiments 3 to 17 further comprising receiving (704) a dynamic indication to start replications for the particular logical channel, wherein replicating (706) the original packet associated to the particular service comprises replicating (706) the original packet responsive to receiving (704) the dynamic indication to start replications for the particular logical channel.

19. The method of embodiment 18 wherein the dynamic indication is comprised in a MAC CE or DCI.

20. The method of any of embodiments 3 to 17 further comprising:
  receiving (716) a dynamic indication to stop replication for the particular logical channel; and
  stopping (7EE) replication of packets associated to the particular logical channel responsive to receiving (716) the dynamic indication to stop replication for the particular logical channel.

21. The method of embodiment 20 wherein the dynamic indication is comprised in a MAC CE or DCI.

22. The method of embodiment 1 wherein:
  replicating (706) the original packet comprises replicating the original packet at the PDCP layer;
  the original packet is an original PDCP packet associated to a particular radio bearer that is associated to the particular service;
  the one or more replicate packets are one or more replicate PDCP packets each being a replication of the original PDCP packet.

23. The method of embodiment 22 wherein, for each PDCP packet from among the set of packets, generating (708) the transport block comprises:
  processing the PDCP packet via a respective one of a plurality of different RLC entities associated to different logical channels being restricted to being transmitted on different cells, to different TRPs, on different MIMO layers, on different frequencies resources, and/or on different time resources, thereby providing a respective RLC packet for the PDCP packet;
  multiplexing the respective RLC packet with one or more other RLC packets associated to one or more other logical channels that are not restricted to being transmitted on a different cell, to a different TRP, on a different frequency resource, and/or on a different time resource.

24. The method of embodiment 23 wherein the restrictions on the different logical channels are configured via dynamic signaling (e.g., MAC CE or DCI).

25. The method of any of embodiments 1 to 24 wherein the particular service is an URLLC service.

26. The method of embodiment 25 wherein transmitting (710) the transport block via the physical layer of the protocol stack of the wireless communication device (412) comprises transmitting (710) the transport block in accordance with requirements of the URLLC service.

27. The method of any of embodiments 1 to 26 wherein the transport blocks comprising original packet and the one or more replicate packets are transmitted using transmit diversity at the physical layer.

28. The method of embodiment 27 wherein transmit diversity at the physical layer is provided via transmitting the transport blocks comprising original packet and the one or more replicate packets to one or more network nodes or TRPs.

29. The method of embodiment 27 wherein transmit diversity at the physical layer is provided via transmitting the original packet and the one or more replicate packets using a multi-TRP scheme, using different beams, and/or using different bandwidth parts.

30. The method of any of embodiments 1 to 26 wherein the transport blocks comprising original packet and the one or more replicate packets are transmitted such that the transport blocks are received at different to network nodes or TRPs.

31. The method of any of the previous embodiments, further comprising:
  providing user data; and
  forwarding the user data to a host computer via the transmission to the network node.

Group B Embodiments

32. A method performed by a base station (402), the method comprising:
  providing (700), to a wireless communication device (402), information related to replication of packets at either an RLC layer or at a PDCP layer;
  wherein the replication of packets is such that an original packet is replicated to provide one or more replicate packets of the original packet and each packet from among the original packet and at least one of the one or more replicate packets is transmitted in a respective transport block.

33. The method of embodiment 32 wherein the information related to replication of packets is information related to replication of packets at the RLC layer comprising:
  a) information that indicates that replication is allowed for one or more logical channels;
  b) information that indicates a maximum number of replications allowed for the one or more logical channels at the RLC layer;
  c) information that indicates a fixed number of replications allowed for the one or more logical channels at the RLC layer;
  d) information that indicates that multiplexing of any of an original RLC packet and one or more replicate RLC packets of the original RLC packet in a same MAC PDU is not allowed;
  e) information that indicates whether physical layer diversity is to be used for transmission of an original RLC packet and one or more replicate RLC packets of the RLC packet; or
  f) a combination of two or more of (a)-(e).

34. The method of any of embodiments 32 to 33 wherein providing (700) the information comprises providing (700) at least some of the information via RRC signaling.

35. The method of any of embodiments 32 to 34 wherein providing (700) the information comprises providing (700) at least some of the information via dynamic signaling (e.g., MAC CE and/or DCI).

36. The method of any of embodiments 32 to 35 further comprising providing (712), to the wireless communication device (412), information that indicates that an original packet or one of one or more replicate packets has been successfully received by the base station (402).

37. The method of any of embodiments 32 to 36 further comprising providing (704), to the wireless communication device (412), a dynamic indication to start replications.

38. The method of embodiment 37 wherein the dynamic indication is comprised in a MAC CE or DCI.

39. The method of any of embodiments 32 to 38 further comprising:
providing (716), to the wireless communication device (412), a dynamic indication to stop replication.

40. The method of embodiment 39 wherein the dynamic indication is comprised in a MAC CE or DCI.

41. The method of any of embodiments 32 to 40 wherein the replication is at the RLC layer for RLC packets associated to a particular logical channel(s) that is associated to a particular service(s).

42. The method of any of embodiments 32 to 40 wherein the replication is at the PDCP layer for PDCP packets associated to a particular service(s).

43. The method of any of embodiments 32 to 42 wherein the replication is provided for packets associated to an URLLC service.

44. The method of any of embodiments 32 to 43 further comprising receiving (710), from the wireless communication device (412), at least one of an original packet and one or more replicates of the original packet that result from the replication at the RLC layer or the PDCP layer.

45. The method of embodiment 44 wherein receiving (710) the at least one of the original packet and the one or more replicates comprises receiving (710) the at least one of the original packet and the one or more replicates at the RLC layer or at the PDCP layer, and the method further comprises providing the received packet to a higher layer.

46. The method of embodiment 44 or 45 wherein the base station (402) includes at least one of two or more TRPs to which the original packet and the one or more replicate packets are transmitted, and receiving (710) the at least one of the original packet and the one or more replicates comprises receiving (710) the at least one of the original packet and the one or more replicates at the at least one of the two or more TRPs comprised in the base station (402).

47. The method of any of the previous embodiments, further comprising:
obtaining user data; and
forwarding the user data to a host computer or a wireless communication device.

Group C Embodiments

48. A wireless communication device comprising:
processing circuitry configured to perform any of the steps of any of the Group A embodiments; and
power supply circuitry configured to supply power to the wireless communication device.

49. A base station comprising:
processing circuitry configured to perform any of the steps of any of the Group B embodiments; and
power supply circuitry configured to supply power to the base station.

50. A User Equipment, UE, comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

51. A communication system including a host computer comprising:
processing circuitry configured to provide user data; and
a communication interface configured to forward the user data to a cellular network for transmission to a User Equipment, UE;
wherein the cellular network comprises a base station having a radio interface and processing circuitry, the base station's processing circuitry configured to perform any of the steps of any of the Group B embodiments.

52. The communication system of the previous embodiment further including the base station.

53. The communication system of the previous 2 embodiments, further including the UE, wherein the UE is configured to communicate with the base station.

54. The communication system of the previous 3 embodiments, wherein:
the processing circuitry of the host computer is configured to execute a host application, thereby providing the user data; and
the UE comprises processing circuitry configured to execute a client application associated with the host application.

55. A method implemented in a communication system including a host computer, a base station, and a User Equipment, UE, the method comprising:
at the host computer, providing user data; and
at the host computer, initiating a transmission carrying the user data to the UE via a cellular network comprising the base station, wherein the base station performs any of the steps of any of the Group B embodiments.

56. The method of the previous embodiment, further comprising, at the base station, transmitting the user data.

57. The method of the previous 2 embodiments, wherein the user data is provided at the host computer by executing a host application, the method further comprising, at the UE, executing a client application associated with the host application.

58. A User Equipment, UE, configured to communicate with a base station, the UE comprising a radio interface and processing circuitry configured to perform the method of the previous 3 embodiments.

59. A communication system including a host computer comprising:
   processing circuitry configured to provide user data; and
   a communication interface configured to forward user data to a cellular network for transmission to a User Equipment, UE;
   wherein the UE comprises a radio interface and processing circuitry, the UE's components configured to perform any of the steps of any of the Group A embodiments.

60. The communication system of the previous embodiment, wherein the cellular network further includes a base station configured to communicate with the UE.

61. The communication system of the previous 2 embodiments, wherein:
   the processing circuitry of the host computer is configured to execute a host application, thereby providing the user data; and
   the UE's processing circuitry is configured to execute a client application associated with the host application.

62. A method implemented in a communication system including a host computer, a base station, and a User Equipment, UE, the method comprising:
   at the host computer, providing user data; and
   at the host computer, initiating a transmission carrying the user data to the UE via a cellular network comprising the base station, wherein the UE performs any of the steps of any of the Group A embodiments.

63. The method of the previous embodiment, further comprising at the UE, receiving the user data from the base station.

64. A communication system including a host computer comprising:
   communication interface configured to receive user data originating from a transmission from a User Equipment, UE, to a base station;
   wherein the UE comprises a radio interface and processing circuitry, the UE's processing circuitry configured to perform any of the steps of any of the Group A embodiments.

65. The communication system of the previous embodiment, further including the UE.

66. The communication system of the previous 2 embodiments, further including the base station, wherein the base station comprises a radio interface configured to communicate with the UE and a communication interface configured to forward to the host computer the user data carried by a transmission from the UE to the base station.

67. The communication system of the previous 3 embodiments, wherein:
   the processing circuitry of the host computer is configured to execute a host application; and
   the UE's processing circuitry is configured to execute a client application associated with the host application, thereby providing the user data.

68. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.

69. A method implemented in a communication system including a host computer, a base station, and a User Equipment, UE, the method comprising:
   at the host computer, receiving user data transmitted to the base station from the UE, wherein the UE performs any of the steps of any of the Group A embodiments.

70. The method of the previous embodiment, further comprising, at the UE, providing the user data to the base station.

71. The method of the previous 2 embodiments, further comprising:
   at the UE, executing a client application, thereby providing the user data to be transmitted; and
   at the host computer, executing a host application associated with the client application.

72. The method of the previous 3 embodiments, further comprising:
   at the UE, executing a client application; and
   at the UE, receiving input data to the client application, the input data being provided at the host computer by executing a host application associated with the client application;
   wherein the user data to be transmitted is provided by the client application in response to the input data.

73. A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

74. The communication system of the previous embodiment further including the base station.

75. The communication system of the previous 2 embodiments, further including the UE, wherein the UE is configured to communicate with the base station.

76. The communication system of the previous 3 embodiments, wherein:
   the processing circuitry of the host computer is configured to execute a host application; and
   the UE is configured to execute a client application associated with the host application, thereby providing the user data to be received by the host computer.

77. A method implemented in a communication system including a host computer, a base station, and a User Equipment, UE, the method comprising:
   at the host computer, receiving, from the base station, user data originating from a transmission which the base station has received from the UE, wherein the UE performs any of the steps of any of the Group A embodiments.

78. The method of the previous embodiment, further comprising at the base station, receiving the user data from the UE.

79. The method of the previous 2 embodiments, further comprising at the base station, initiating a transmission of the received user data to the host computer.

The invention claimed is:

1. A method performed by a wireless communication device, the method comprising:
   replicating, at a Radio Link Control (RLC) layer of a protocol stack of the wireless communication device, an original packet associated to a particular service to provide one or more replicate packets, wherein each of the one or more replicate packets is a replication of the original packet;
   for each packet from among a set of packets consisting of the original packet and at least one of the one or more replicate packets:
      generating a transport block that comprises the packet; and transmitting the transport block to one or more base stations or transmission/reception points (TRPs) via a physical layer of the protocol stack of the wireless communication device.

2. The method of claim 1, wherein at least one of the generated transport blocks further comprises data associated to one or more other services that is multiplexed within the transport block with the respective packet, and wherein the one or more other services include a mobile broadband (MBB) service.

3. The method of claim 1, wherein transmitting the transport block via the physical layer of the protocol stack of the wireless communication device comprises transmitting the transport block in accordance with requirements of the particular service.

4. The method of claim 1, further comprising receiving, from a network node, information related to replication of packets at the RLC layer, wherein said replicating is performed based on the received information, wherein the information comprises:
 a) information that indicates that replication is allowed for one or more logical channels;
 b) information that indicates a maximum number of replications allowed for one or more logical channels at the RLC layer;
 c) information that indicates a fixed number of replications allowed for one or more logical channels at the RLC layer; or
 d) a combination of two or more of (a)-(c).

5. The method of claim 1, further comprising receiving, from a network node, information related to replication of packets at the RLC layer, wherein said replicating is performed based on the received information, wherein the information comprises:
 a) information that indicates that multiplexing of any original RLC packet and one or more replicate RLC packets of the original RLC packet in a same Medium Access Control (MAC) Protocol Data Unit (PDU) is not allowed;
 b) information that indicates whether physical layer diversity is to be used for transmission of an original RLC packet and one or more replicate RLC packets of the original RLC packet; or
 c) both (a) and (b).

6. The method of claim 1, further comprising determining how many of the one or more replicate packets to provide via said replicating, based on either:
 signaling received from a network node indicating how many of the one or more replicate packets to provide via said replicating; or
 a channel state measured by the wireless communication device.

7. The method of claim 1, further comprising, before all of the one or more replicate packets have been transmitted:
 receiving, from a network node, information that indicates that the original packet or one of the one or more replicate packets has been successfully received by the network node; and
 stopping transmission of any of the one or more replicate packets that have not yet been transmitted as of reception of the information from the network node.

8. The method of claim 7, wherein receiving the information that indicates that the original packet or one of the one or more replicate packets has been successfully received by the network node comprises:

receiving a status report that indicates that the original packet or one of the one or more replicate packets has been successfully received by a respective entity at the network node; or
receiving a Downlink Control Information (DCI) message that indicates a toggled New Data Indicator (NDI) for a Hybrid Automatic Repeat Request (HARQ) buffer associated to the one or more replicate packets.

9. The method of claim 1, wherein the original packet is an original RLC packet associated to a particular logical channel, wherein the particular logical channel is associated to the particular service, and wherein the one or more replicate packets are one or more replicate RLC packets, wherein each replicate RLC packet is a replication of the original RLC packet, and wherein, for each RLC packet from among the set of packets, generating the transport block for the RLC packet comprises multiplexing the RLC packet and one or more additional RLC packets that are associated to one or more other logical channels in the transport block.

10. The method of claim 1, wherein the original packet is an original RLC packet associated to a particular logical channel, wherein the particular logical channel is associated to the particular service, wherein the method further comprises receiving a dynamic indication to start replication of packets for the particular logical channel, wherein the dynamic indication is comprised in a MAC Control Element (CE) or a DCI message, wherein replicating the original packet associated to the particular service comprises replicating the original packet based on:
 having received the dynamic indication to start replication; and
 since having received the dynamic indication to start replication, not having received a dynamic indication to stop replication for the particular logical channel.

11. The method of claim 1, wherein the transport blocks comprising the original packet and the one or more replicate packets are transmitted to multiple different network nodes or TRPs and/or are transmitted on multiple different cells.

12. The method of claim 1, further comprising transmitting, to a network node, a buffer status report that includes:
 a first field that reports a total buffer size of a logical channel group that contains multiple logical channels, including a logical channel associated to the particular service; and
 a second field that reports a total buffer size of replicated data of the multiple logical channels within the logical channel group.

13. The method of claim 1, further comprising receiving an uplink grant scheduling the wireless communication device for transmission in multiple slots, and determining, based on how many slots are scheduled by the uplink grant, how many of the one or more replicate packets to provide via said replicating.

14. The method of claim 1, wherein the particular service is an Ultra-Reliable Low-Latency Communication (URLLC) service.

15. The method of claim 1, wherein the original packet is an original RLC Protocol Data Unit (PDU).

16. The method of claim 1, wherein said replicating is performed by a transmitting RLC entity at the RLC layer, wherein the original packet and each of the one or more replicate packets is an RLC packet.

17. A method performed by a base station, the method comprising:
 providing, to a wireless communication device, information related to replication of packets by the wireless communication device at a Radio Link Control (RLC) layer of a protocol stack of the wireless communication device;

wherein the replication of packets is such that the wireless communication device is to replicate an original packet associated to a particular service to provide one or more replicate packets of the original packet and to transmit each packet, from among the original packet and at least one of the one or more replicate packets, in a respective transport block.

18. The method of claim 17, wherein the information comprises:
   a) information that indicates that replication is allowed for one or more logical channels;
   b) information that indicates a maximum number of replications allowed for one or more logical channels at the RLC layer;
   c) information that indicates a fixed number of replications allowed for one or more logical channels at the RLC layer; or
   d) a combination of two or more of (a)-(c).

19. The method of claim 17, wherein the information comprises:
   a) information that indicates that multiplexing of any original RLC packet and one or more replicate RLC packets of the original RLC packet in a same Medium Access Control (MAC) Protocol Data Unit (PDU) is not allowed;
   b) information that indicates whether physical layer diversity is to be used for transmission of an original RLC packet and one or more replicate RLC packets of the original RLC packet; or
   c) both (a) and (b).

20. The method of claim 17, further comprising providing, to the wireless communication device, information that indicates that an original packet or one of one or more replicate packets has been successfully received by the base station, wherein the information that indicates that the original packet or one of the one or more replicate packets has been successfully received by the network node comprises:
   receiving an RLC status report that indicates that the original packet or one of the one or more replicate packets has been successfully received by a respective RLC entity at the network node; or
   receiving a Downlink Control Information (DCI) message that indicates a toggled New Data Indicator (NDI) for a Hybrid Automatic Repeat Request (HARQ) buffer associated to the one or more replicate packets.

21. The method of claim 17, wherein the original packet is an original RLC packet associated to a particular logical channel, wherein the particular logical channel is associated to the particular service, wherein the method further comprises providing, to the wireless communication device, a dynamic indication to start replication of packets for the particular logical channel, wherein the dynamic indication is comprised in a MAC Control Element (CE) or a DCI message.

22. The method of claim 17, wherein particular service is an URLLC service.

23. The method of claim 17, further comprising receiving, from the wireless communication device, at least one of an original packet and one or more replicates of the original packet that result from the replication at the RLC layer.

24. The method of claim 17, wherein the base station includes at least one of two or more TRPs to which the original packet and the one or more replicate packets are transmitted, and receiving the at least one of the original packet and the one or more replicates comprises receiving the at least one of the original packet and the one or more replicates at the at least one of the two or more TRPs comprised in the base station.

25. The method of claim 17, wherein the original packet is an original RLC Protocol Data Unit (PDU).

26. A wireless communication device comprising:
   power supply circuitry configured to supply power to the wireless communication device; and
   processing circuitry configured to:
      replicate, at a Radio Link Control (RLC) layer of a protocol stack of the wireless communication device, an original packet associated to a particular service to provide one or more replicate packets, wherein each of the one or more replicate packets is a replication of the original packet;
      for each packet from among a set of packets consisting of the original packet and at least one of the one or more replicate packets:
         generate a transport block that comprises the packet; and
         transmit the transport block to one or more base stations or transmission/reception points (TRPs) via a physical layer of the protocol stack of the wireless communication device.

27. The wireless communication device of claim 26, wherein a transmitting RLC entity implemented by the processing circuitry is configured to replicate the original packet at the RLC layer, wherein the original packet and each of the one or more replicate packets is an RLC packet.

28. A base station comprising:
   power supply circuitry configured to supply power to the base station; and
   processing circuitry configured to:
      provide, to a wireless communication device, information related to replication of packets by the wireless communication device at a Radio Link Control (RLC) layer of a protocol stack of the wireless communication device;
      wherein the replication of packets is such that the wireless communication device is to replicate an original packet associated to a particular service to provide one or more replicate packets of the original packet and to transmit each packet, from among the original packet and at least one of the one or more replicate packets, in a respective transport block.

* * * * *